United States Patent
Noguchi et al.

(10) Patent No.: US 12,259,315 B2
(45) Date of Patent: Mar. 25, 2025

(54) ULTRASONIC TRANSDUCER HOLDER, CONTAINER, AND ANALYSIS SYSTEM USING SAME

(71) Applicant: HITACHI HIGH-TECH CORPORATION, Tokyo (JP)

(72) Inventors: Toshimitsu Noguchi, Tokyo (JP); Takuya Kambayashi, Tokyo (JP); Akihiro Nojima, Tokyo (JP); Shunsuke Kono, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 183 days.

(21) Appl. No.: 18/015,369

(22) PCT Filed: Jul. 27, 2020

(86) PCT No.: PCT/JP2020/028731
§ 371 (c)(1),
(2) Date: Jan. 10, 2023

(87) PCT Pub. No.: WO2022/024190
PCT Pub. Date: Feb. 3, 2022

(65) Prior Publication Data
US 2023/0324280 A1    Oct. 12, 2023

(51) Int. Cl.
*G01N 21/03*    (2006.01)
*G01N 21/31*    (2006.01)

(52) U.S. Cl.
CPC ............. *G01N 21/03* (2013.01); *G01N 21/31* (2013.01)

(58) Field of Classification Search
CPC ...... G01N 21/03; G01N 21/31; G01N 29/222; G01N 29/036; G01N 29/2418; G01N 2021/0367
See application file for complete search history.

(56) References Cited

U.S. PATENT DOCUMENTS

| | | |
|---|---|---|
| 7,727,480 B2 | 6/2010 | Tajima |
| 2012/0086938 A1 | 4/2012 | Folkenberg |

(Continued)

FOREIGN PATENT DOCUMENTS

| | | |
|---|---|---|
| JP | S60-070351 A | 4/1985 |
| JP | S60-220856 A | 11/1985 |

(Continued)

OTHER PUBLICATIONS

Rattay hans "System For Detective Gas Bubbles Or Other Inclusions In Fluid Pipe Flows", Apr. 11, 1996, DE 4435594 A1 (Year: 1996).*

(Continued)

*Primary Examiner* — Sang H Nguyen
(74) *Attorney, Agent, or Firm* — Miles & Stockbridge, P.C.

(57) ABSTRACT

An ultrasonic transducer holder, which is an embodiment, has a detachable container for containing a liquid sample, and transmits an ultrasonic wave. The ultrasonic transducer holder includes an ultrasonic transducer that emits an ultrasonic wave, and a protective layer that is fixed to the ultrasonic transducer and transmits the ultrasonic wave to the container. The protective layer includes a first surface that is a surface to which the ultrasonic transducer is fixed, and a second surface that is a back surface of the first surface and is designed to fix the container via a contact medium.

15 Claims, 15 Drawing Sheets

(56) References Cited

U.S. PATENT DOCUMENTS

| | | | | |
|---|---|---|---|---|
| 2018/0172584 A1* | 6/2018 | Kanbayashi | ......... | G01N 21/534 |
| 2019/0299129 A1* | 10/2019 | Noguchi | ................ | B01D 21/01 |
| 2019/0368999 A1* | 12/2019 | Kambayashi | ...... | G01N 15/1404 |
| 2020/0182751 A1* | 6/2020 | Noguchi | .............. | G01N 35/025 |

FOREIGN PATENT DOCUMENTS

| | | | |
|---|---|---|---|
| JP | H09-089851 | A | 4/1997 |
| JP | 2005-037244 | A | 2/2005 |
| JP | 2008-151599 | A | 7/2008 |
| JP | 4613145 | B2 | 1/2011 |
| JP | 2019-211235 | A | 12/2019 |
| TW | 200613715 | A | 5/2006 |

OTHER PUBLICATIONS

Office Action mailed Feb. 17, 2022 in Taiwanese Patent Application No. 110123508.
Search Report mailed Oct. 6, 2022 in International Application No. PCT/JP2020/028731.
Written Opinion mailed Oct. 6, 2022 in International Application No. PCT/JP2020/028731.

* cited by examiner

[FIG. 1]
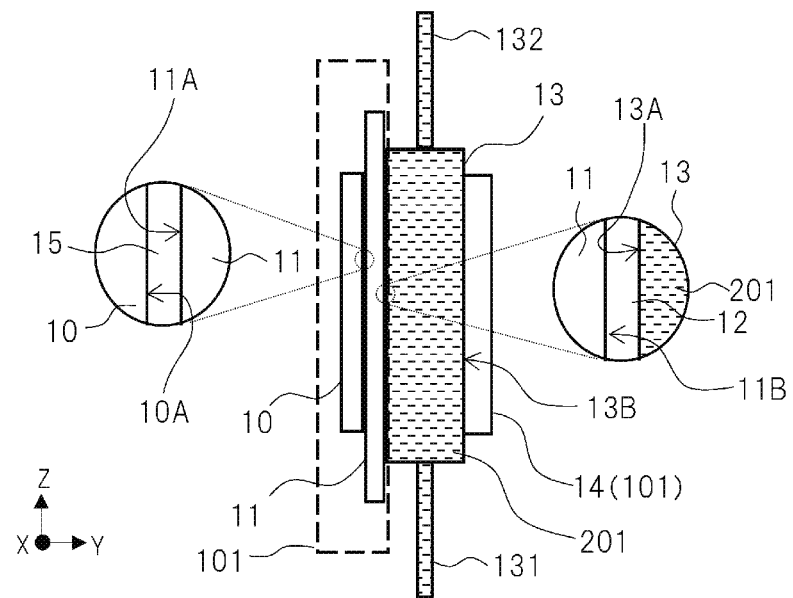
[FIG. 2]
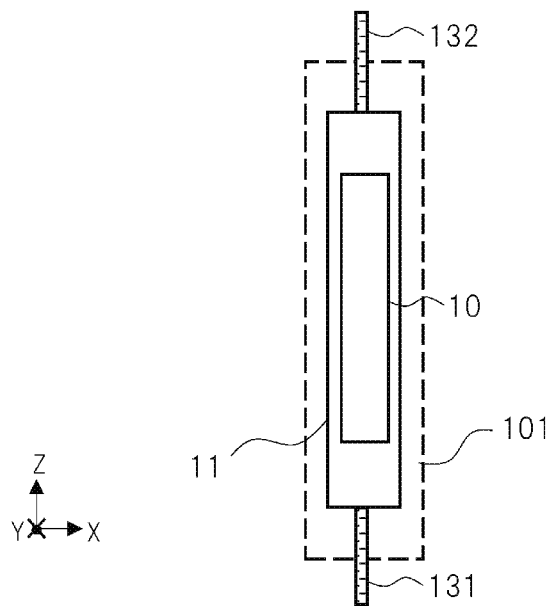

[FIG. 3]
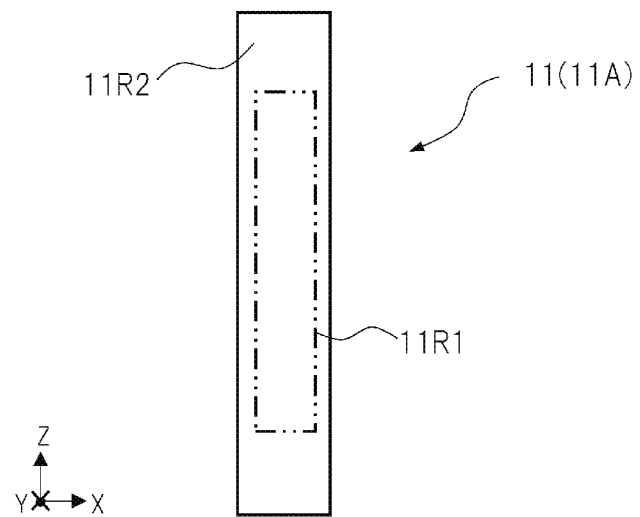
[FIG. 4]
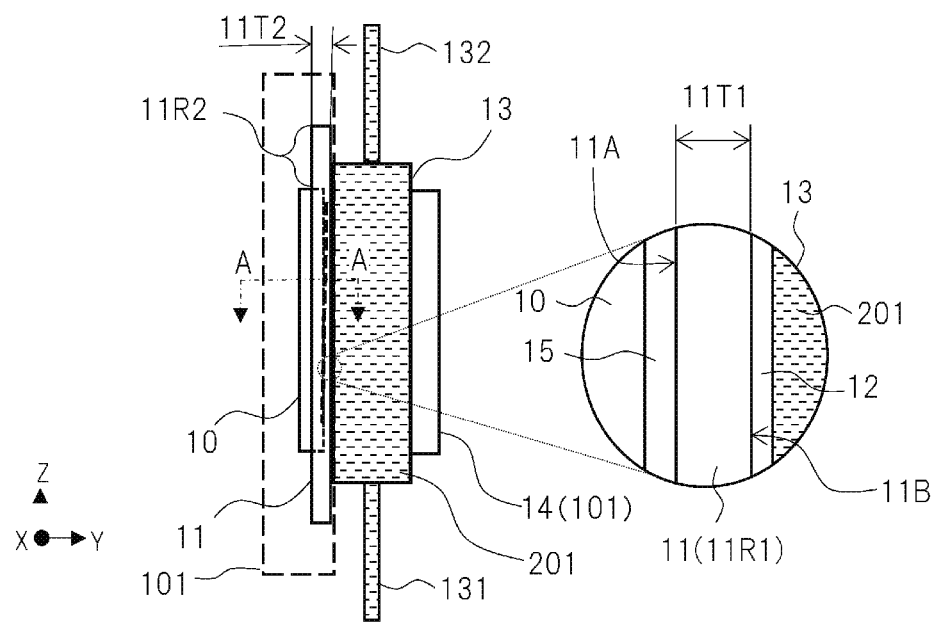

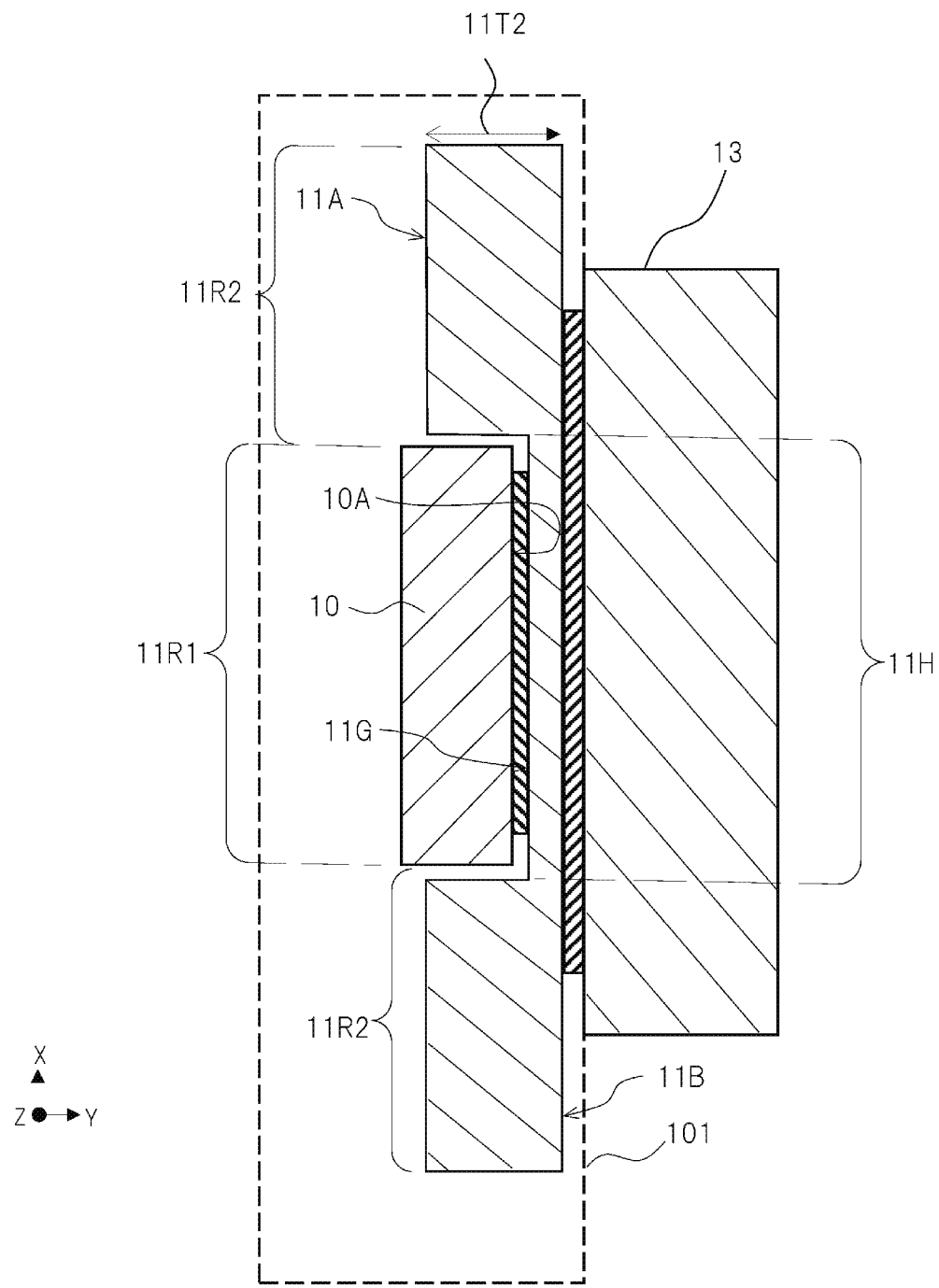
[FIG. 5]

[FIG. 6]
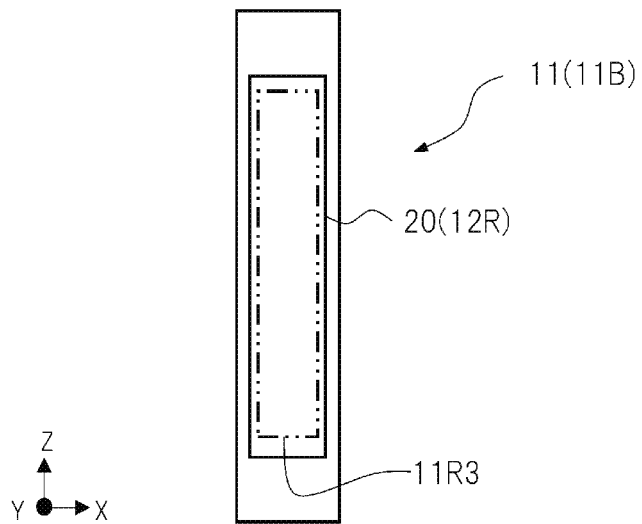
[FIG. 7]
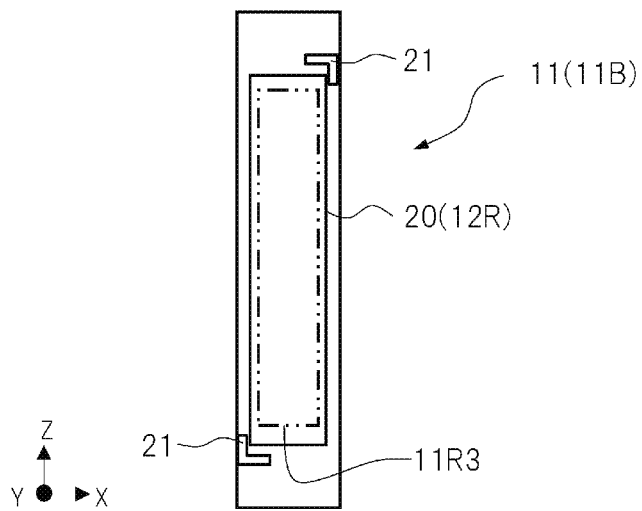

[FIG. 8]
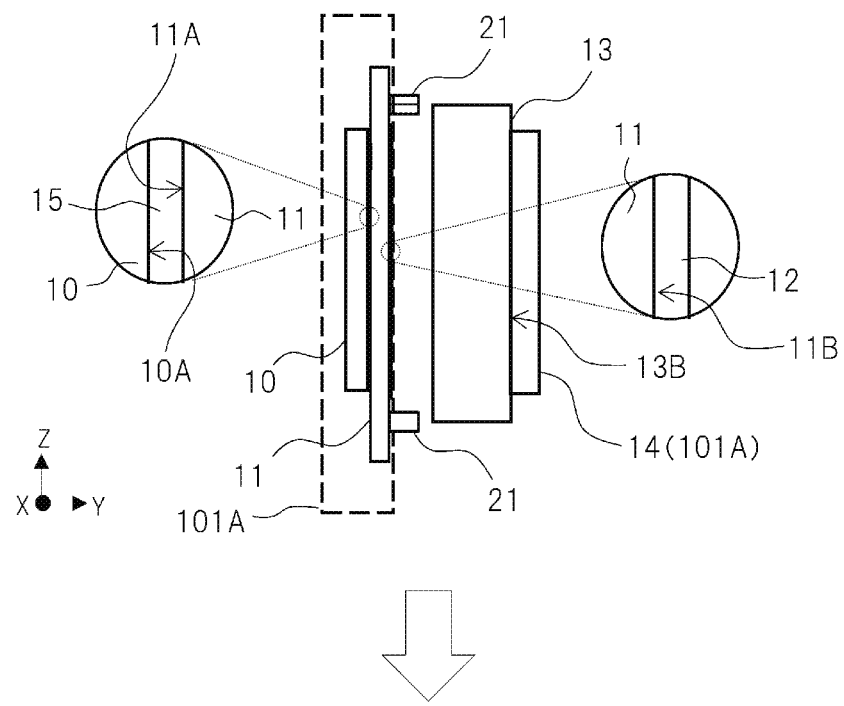
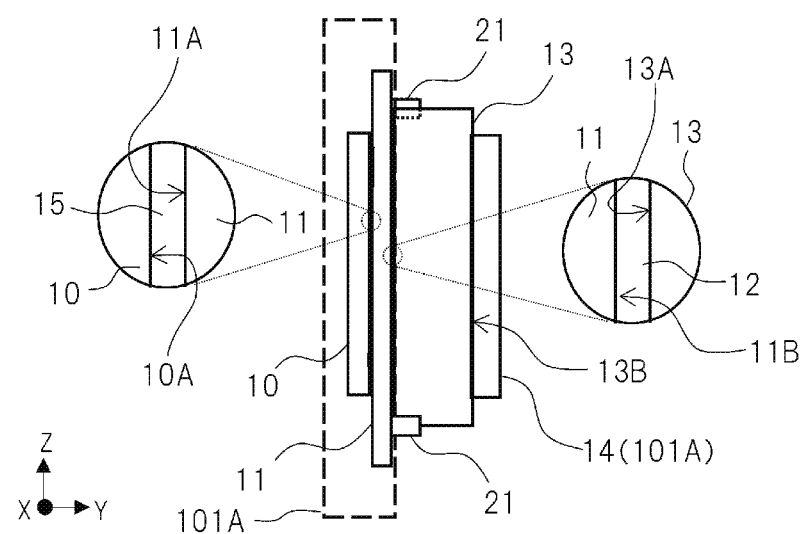

[FIG. 9]
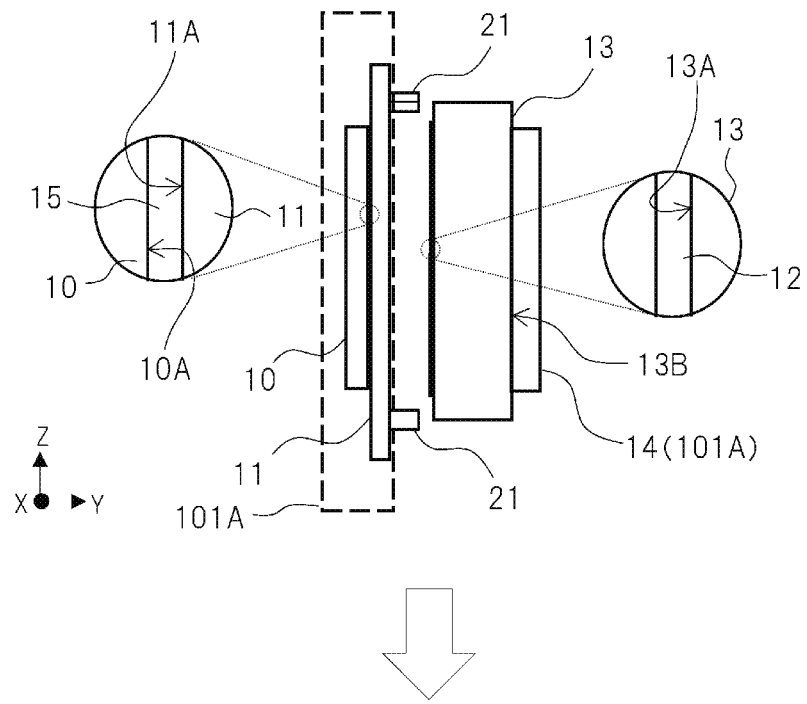
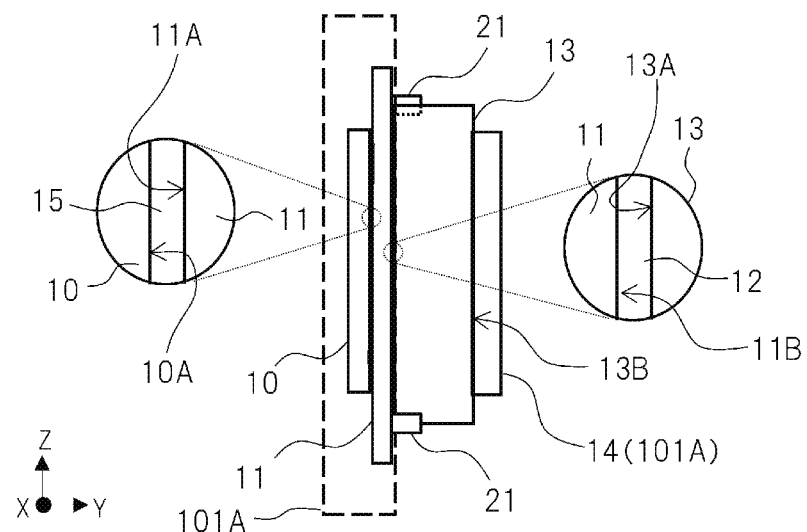

[FIG. 10]
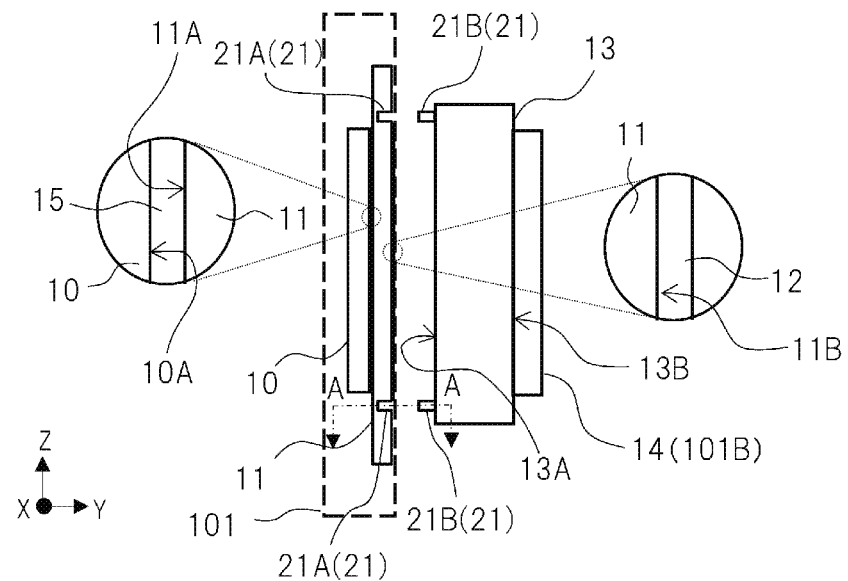
[FIG. 11]
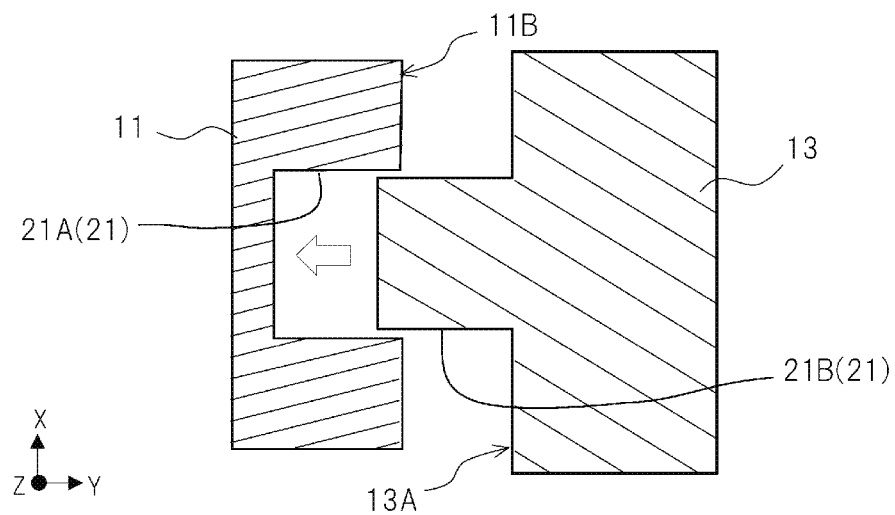

[FIG. 12]
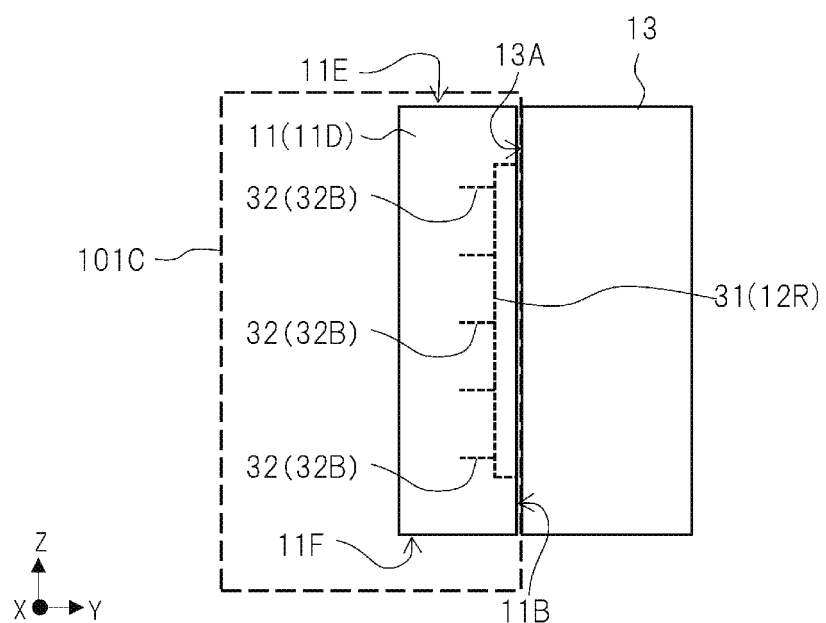
[FIG. 13]
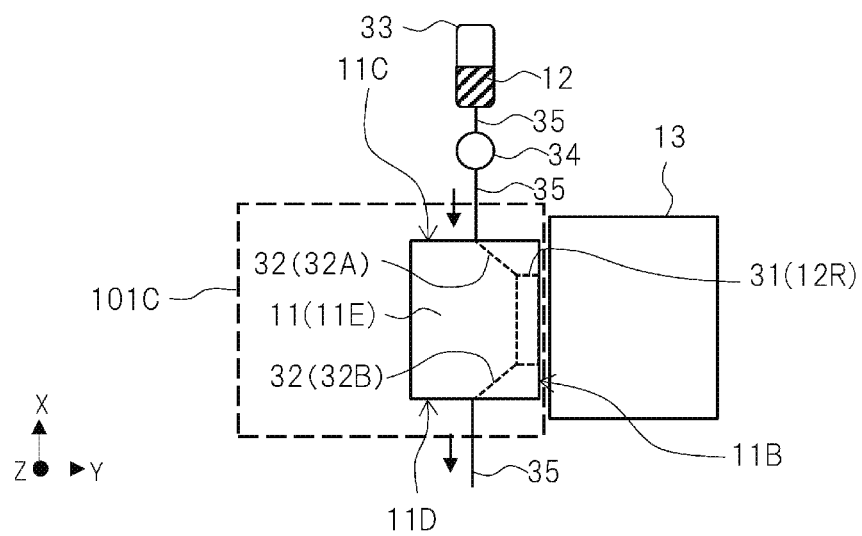

[FIG. 14]
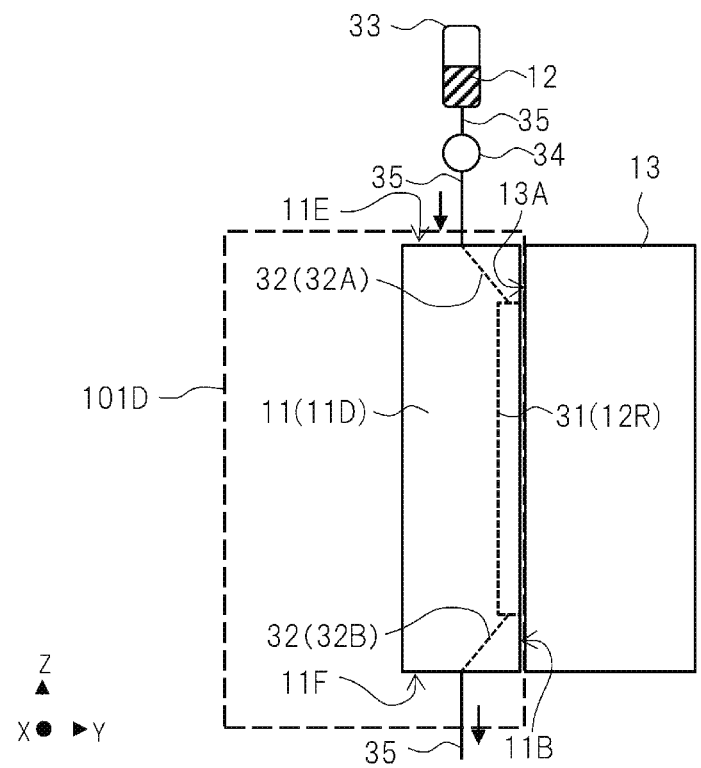
[FIG. 15]
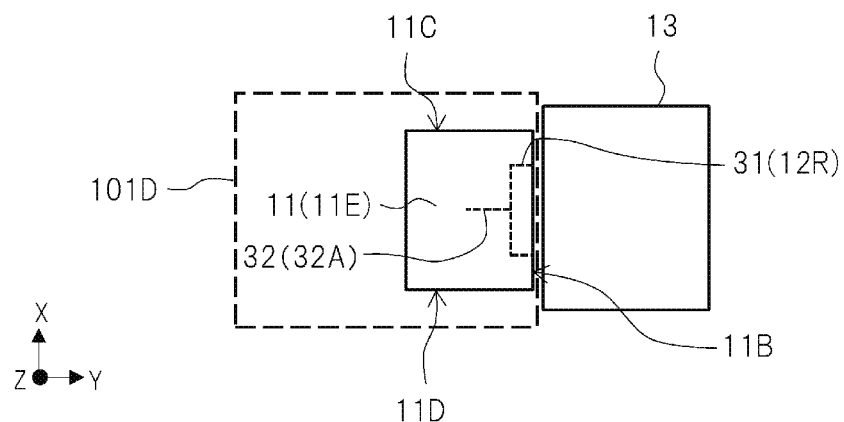

[FIG. 16]
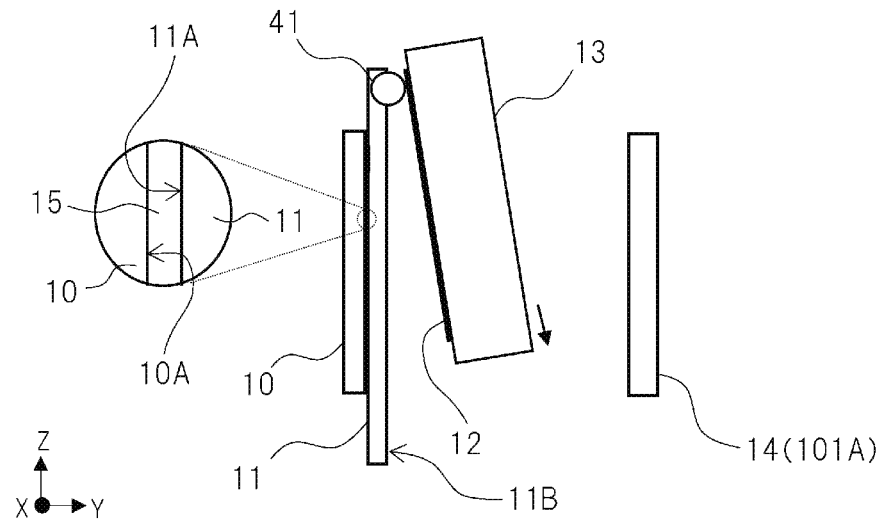
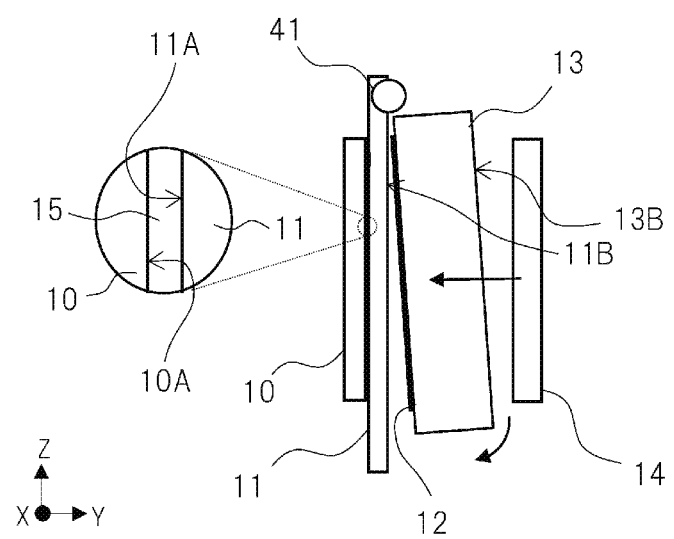

[FIG. 17]
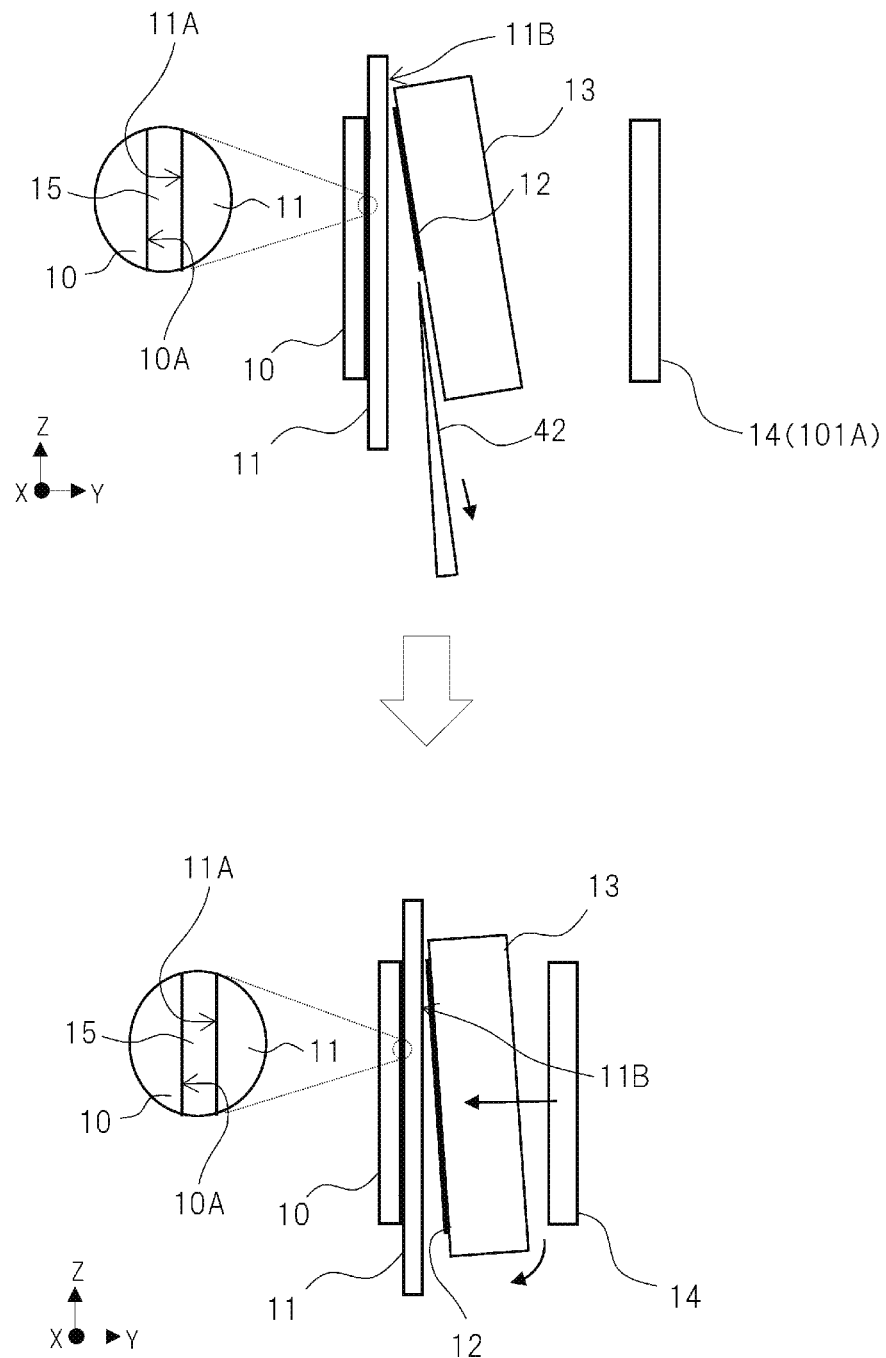

[FIG. 18]
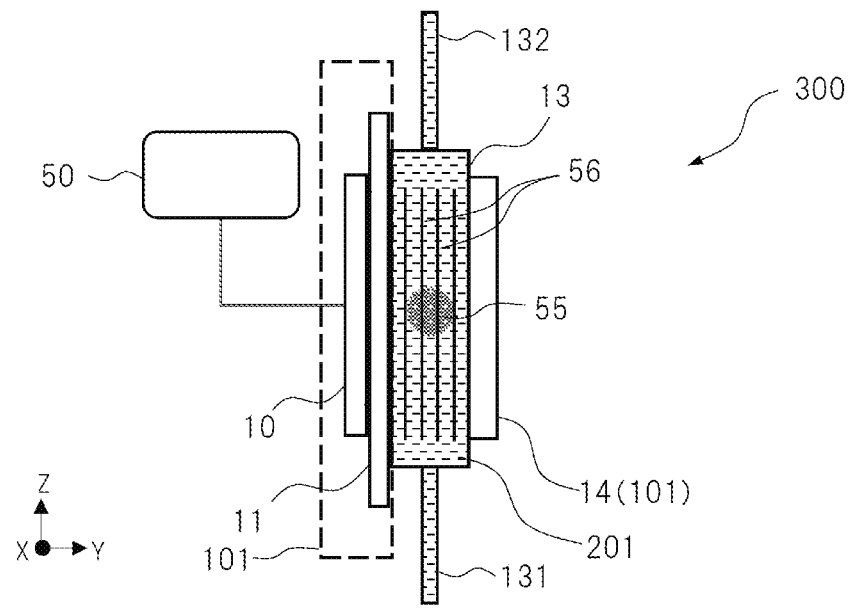
[FIG. 19]
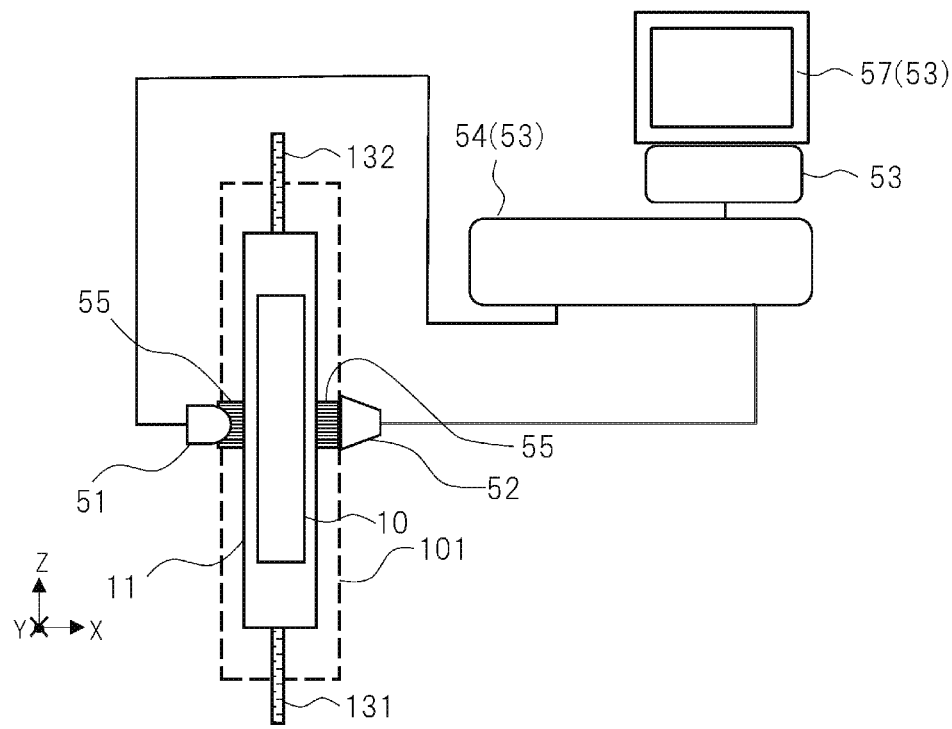

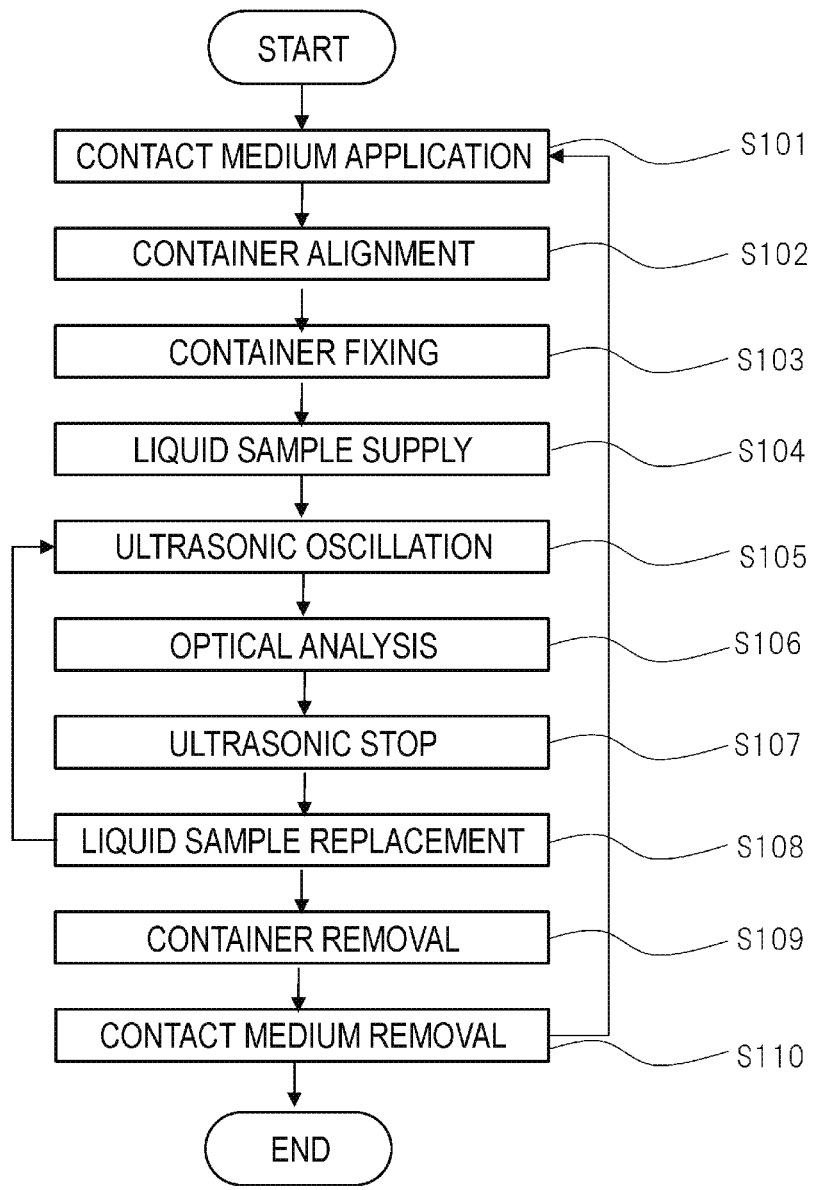
[FIG. 20]

[FIG. 21]
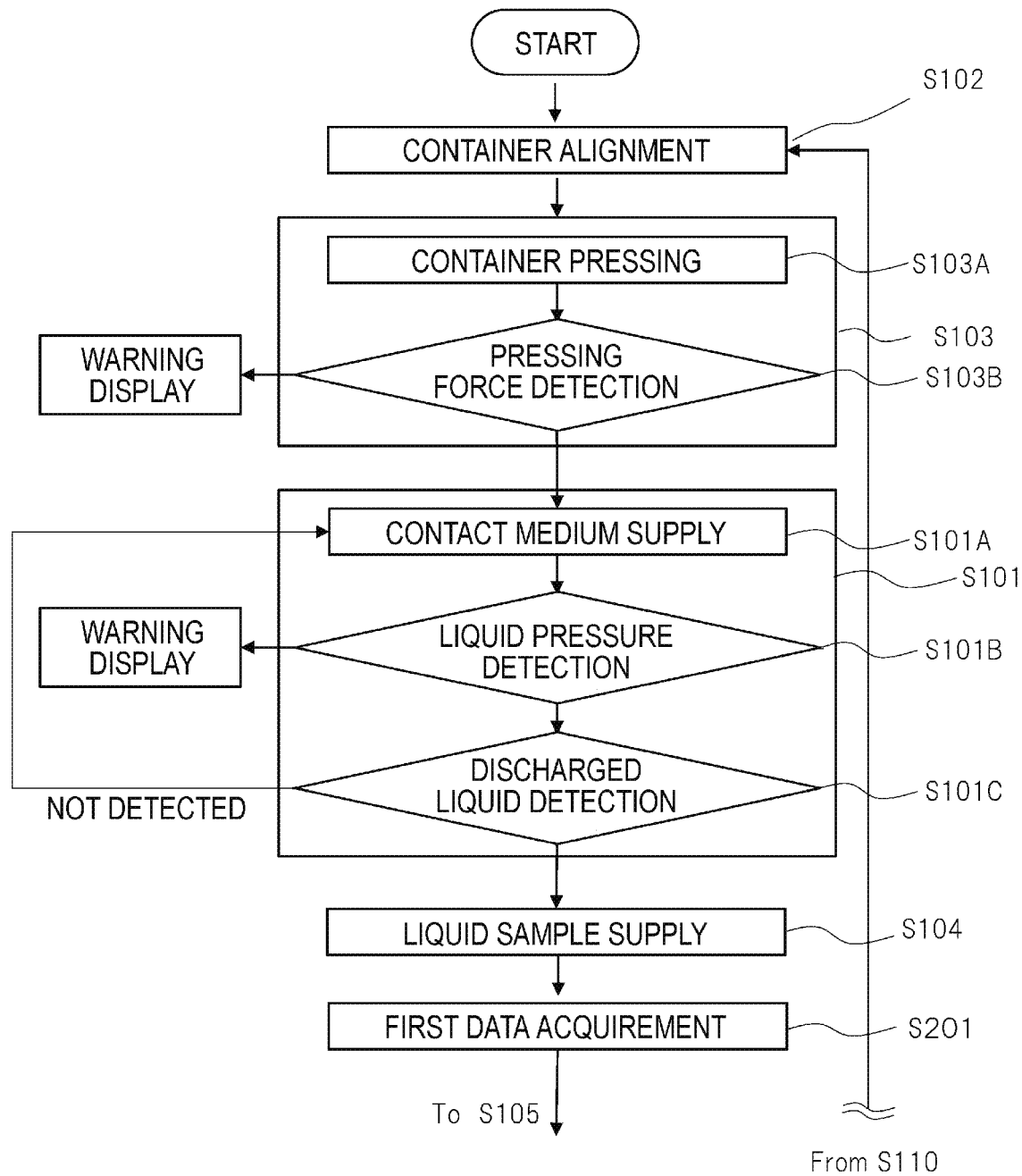

[FIG. 22]
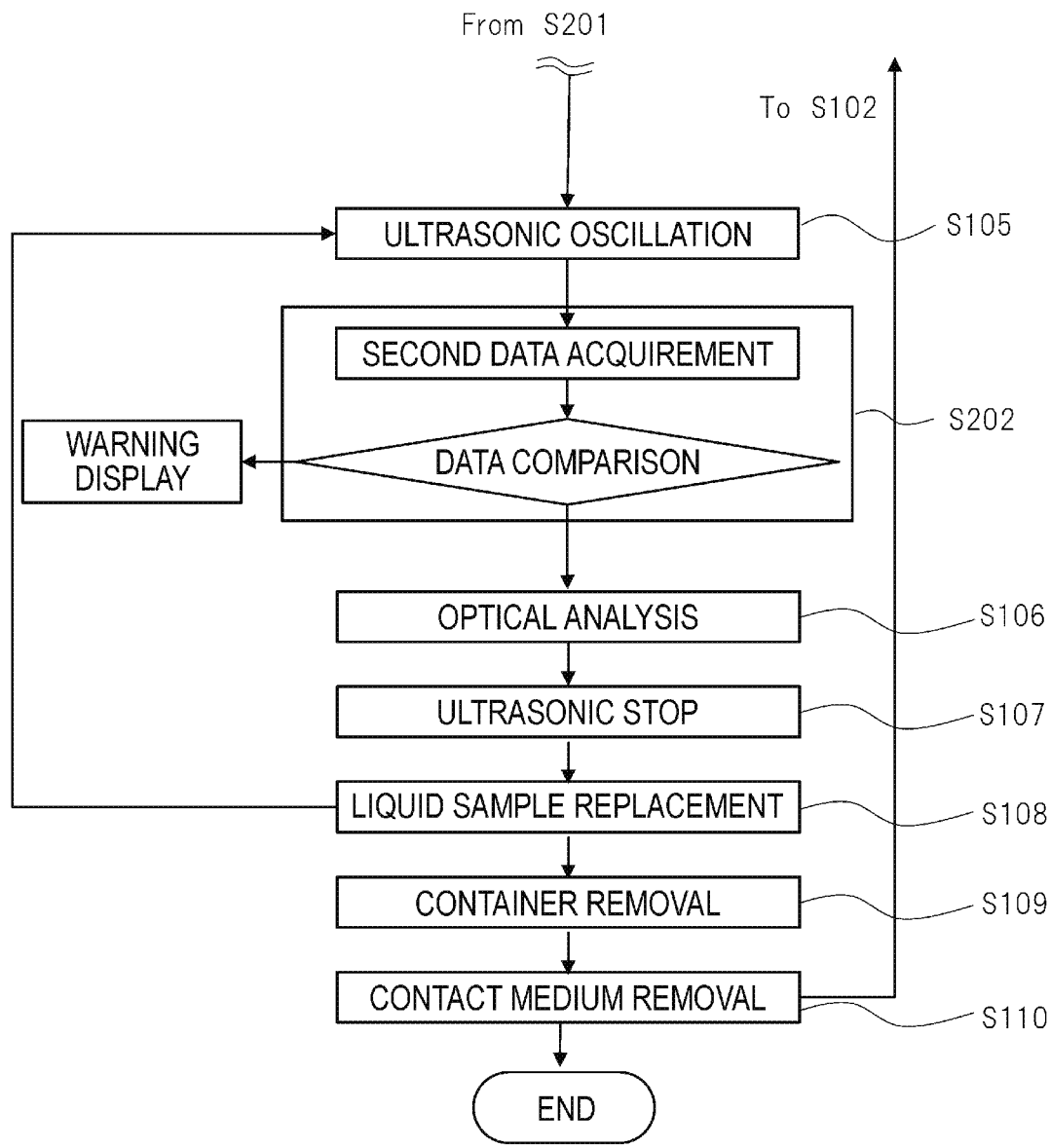

ULTRASONIC TRANSDUCER HOLDER, CONTAINER, AND ANALYSIS SYSTEM USING SAME

TECHNICAL FIELD

The present invention relates to an ultrasonic transducer holder, a container, and an analysis system using these.

BACKGROUND ART

JP2019-211235A (PTL 1) describes an analysis cell for accommodating a liquid sample that is detachably replaceable with respect to an analysis unit. Further, PTL 1 describes that an ultrasonic transducer and a wall surface of the analysis cell are brought into close contact with each other via a gel substance.

CITATION LIST

Patent Literature

PTL 1: JP2019-211235A

SUMMARY OF INVENTION

Technical Problem

In a device that optically analyzes components in a suspended liquid sample using ultrasonic waves, by making a container that accommodates a liquid sample detachable from an ultrasonic transducer holder, it becomes possible to use an ultrasonic transducer repeatedly. However, it is necessary to suppress deterioration of analysis accuracy caused by making the container detachable from the ultrasonic transducer holder.

An object of the invention is to provide a technique for suppressing deterioration in analysis accuracy in an analysis system in which a container for accommodating a liquid sample is detachable from an ultrasonic transducer holder.

Solution to Problem

A brief outline of a representative form of the invention disclosed in the present application is as follows.

That is, an ultrasonic transducer holder, which is an embodiment, has a detachable container for containing a liquid sample, and transmits an ultrasonic wave. The ultrasonic transducer holder includes an ultrasonic transducer that emits an ultrasonic wave, and a protective layer that is fixed to the ultrasonic transducer and transmits the ultrasonic wave to the container. The protective layer includes a first surface that is a surface to which the ultrasonic transducer is fixed, and a second surface that is a back surface of the first surface and is designed to fix the container via a contact medium.

An analysis system, which is another embodiment, includes the ultrasonic transducer holder, an oscillator that applies voltage to the ultrasonic transducer, a light source that irradiates the container with a light ray, a light receiving portion that receives a light ray transmitted through the container, and a computer that performs analysis processing of the liquid sample based on the light ray received by the light receiving portion. The ultrasonic transducer holder has a detachable container for containing a liquid sample, and transmits an ultrasonic wave. The ultrasonic transducer holder includes an ultrasonic transducer that emits an ultrasonic wave, and a protective layer that is fixed to the ultrasonic transducer and transmits the ultrasonic wave to the container. The protective layer includes a first surface that is a surface to which the ultrasonic transducer is fixed, and a second surface that is a back surface of the first surface and is designed to fix the container via a contact medium.

A container, which is still another embodiment, is a container that is detachable from the ultrasonic transducer holder. The ultrasonic transducer holder has a detachable container for containing a liquid sample, and transmits an ultrasonic wave. The ultrasonic transducer holder includes an ultrasonic transducer that emits an ultrasonic wave, and a protective layer that is fixed to the ultrasonic transducer and transmits the ultrasonic wave to the container. The protective layer includes a first surface that is a surface to which the ultrasonic transducer is fixed, and a second surface that is a back surface of the first surface and is designed to fix the container via a contact medium. The second surface has an application region mark that is a mark indicating an application region of the contact medium. The container includes a side surface having a shape corresponding to the application region, an inlet for feeding the liquid sample, and an outlet for discharging the liquid sample.

Advantageous Effects of Invention

Among inventions disclosed in the present application, the effect obtained by representative one is briefly described below. That is, in the analysis system in which the container for accommodating the liquid sample is detachable from the ultrasonic transducer holder, it is possible to suppress the deterioration of analysis accuracy.

Problems, configurations, and effects other than those described above will be clarified by the following description of embodiments.

BRIEF DESCRIPTION OF DRAWINGS

FIG. 1 is a front view illustrating a state in which a container is attached to an ultrasonic transducer holder that is an embodiment of the present invention.

FIG. 2 is a side view of the ultrasonic transducer holder illustrated in FIG. 1 as viewed from an ultrasonic transducer side.

FIG. 3 is a plan view illustrating a first surface of a protective layer illustrated in FIG. 1.

FIG. 4 is a front view illustrating an ultrasonic transducer holder having a modification example of the protective layer illustrated in FIG. 1 and a container.

FIG. 5 is a cross-sectional view illustrating a cross section cut parallel to an X-Y plane along the line A-A illustrated in FIG. 4.

FIG. 6 is a plan view illustrating a second surface of the protective layer illustrated in FIG. 3.

FIG. 7 is a plan view illustrating a second surface of a protective layer of the ultrasonic transducer holder which is a modification example to FIG. 6.

FIG. 8 is an explanatory view illustrating steps of fixing the container to the ultrasonic transducer holder provided with the protective layer illustrated in FIG. 7.

FIG. 9 is an explanatory view illustrating steps that are a modification example to FIG. 8.

FIG. 10 is a front view illustrating a configuration example of an ultrasonic transducer holder that is a modification example to FIGS. 8 and 9.

FIG. 11 is a cross-sectional view illustrating a cross section cut parallel to the X-Y plane along the line A-A of FIG. 10.

FIG. 12 is a front view illustrating a protective layer provided in a modification example of the ultrasonic transducer holder illustrated in FIG. 1 and a container fixed in a vicinity of the protective layer.

FIG. 13 is a top view schematically illustrating how a contact medium is supplied to a recess of the protective layer illustrated in FIG. 12.

FIG. 14 is a front view illustrating a modification example to FIG. 12.

FIG. 15 is a top view schematically illustrating how a contact medium is supplied to a recess of a protective layer illustrated in FIG. 14.

FIG. 16 is an explanatory view illustrating a modification example of a container fixing method illustrated in FIG. 9.

FIG. 17 is an explanatory view illustrating another modification example of the container fixing method illustrated in FIG. 9.

FIG. 18 is as explanatory view (front view) illustrating a configuration example of an analysis system using the ultrasonic transducer holder illustrated in FIG. 1.

FIG. 19 is a side view of the ultrasonic transducer holder illustrated in FIG. 18 as viewed from an ultrasonic transducer side.

FIG. 20 is an explanatory view illustrating a process flow of an analysis method using the analysis system illustrated in FIGS. 18 and 19.

FIG. 21 is an explanatory diagram illustrating an example of a process flow by a computer in an analysis method using the analysis system illustrated in FIGS. 18 and 19.

FIG. 22 is an explanatory view illustrating an example of a process flow following FIG. 21.

DESCRIPTION OF EMBODIMENTS

In each drawing for illustrating following embodiments, the same members are basically denoted by the same reference numerals and letters, and repeated description thereof will be omitted. In order to make the drawing easier understand, even a plan view may be hatched.

Ultrasonic Transducer Holder

FIG. 1 is a front view illustrating a state in which a container is attached to an ultrasonic transducer holder as an example. FIG. 2 is a side view (a side view viewed in an X direction in FIG. 1) of the ultrasonic transducer holder illustrated in FIG. 1 as seen from an ultrasonic transducer side. In the following description, a front view refers to a view illustrating, among four surfaces between a top surface and a bottom surface of the ultrasonic transducer holder, the surface of a direction in which an ultrasonic transducer 10, an ultrasonic transducer holder 101, a protective layer 11, and a container 13 are arranged in a lateral direction. When there are two surfaces in a direction of visual recognition as described above, as illustrated in FIG. 1, a front view is a view illustrating a surface on which the ultrasonic transducer 10, the ultrasonic transducer holder 101, and the protective layer 11 are arranged in order from a left side of the paper. A view on an opposite side of the front view is a rear view. A view illustrating a side surface other than the front and rear surfaces of the four surfaces described above is called a side view (for example, see FIG. 2). Further, in each drawing, arrows indicate directions of X, Y, and Z, which are orthogonal to each other, in order to indicate from which direction the drawing is viewed. An X-Y plane, including the X and Y directions, forms a horizontal plane, and the Z direction forms a vertical direction.

As illustrated in FIG. 1, the ultrasonic transducer holder 101 of the present embodiment has a function of applying ultrasonic waves to the container 13 containing a liquid sample 201 to be analyzed. The container 13 is attachable to and detachable from the ultrasonic transducer holder 101. An example of a method for attaching and detaching the container 13 will be described below. When the container 13 is detachable, the ultrasonic transducer 10 and the container 13 can be separated. In this case, for example, when the container 13 is used for single use (disposable), the ultrasonic transducer 10 can be used repeatedly because the container 13 can be separated and replaced. Further, when cleaning the container 13, the cleanability of the container 13 is improved by cleaning the container 13 in a state separated from the ultrasonic transducer 10.

The ultrasonic transducer holder 101 has at least the ultrasonic transducer 10, the protective layer 11 that protects the ultrasonic transducer 10, and a contact medium 12 interposed between the protective layer 11 and the container 13. The above are the main parts that the ultrasonic transducer holder 101 has, and it is not excluded that parts other than the above are included. For example, a lead (not illustrated) for supplying electric power to the ultrasonic transducer 10 corresponds to this, and is omitted in FIG. 1.

The protective layer 11 is fixed to the ultrasonic transducer 10. The protective layer 11 has a function of transmitting ultrasonic waves to the container 13 and a protective function of suppressing damage to the ultrasonic transducer 10. The protective layer 11 has a first surface 11A, which is a surface fixed to the ultrasonic transducer 10, and a second surface 11B, which is a rear surface of the first surface 11A and is designed to fix the container 13 via the contact medium 12.

When the container 13 and the ultrasonic transducer holder 101 are detachable, the ultrasonic transducer 10 may be damaged when the container 13 is attached or when the ultrasonic transducer 10 is used repeatedly. One of the reasons why the ultrasonic transducer 10 is damaged by repeated use is that the ultrasonic transducer is used for a long time. Damage to the ultrasonic transducer 10 includes not only the ultrasonic transducer 10 not operating but also the ultrasonic transducer 10 not outputting ultrasonic waves as set. When the ultrasonic transducer 10 does not output ultrasonic waves as set, including the state where the ultrasonic transducer 10 does not operate, it is not possible to apply correct ultrasonic waves to the container 13, which causes a decrease in analysis accuracy.

In the ultrasonic transducer holder 101 illustrated in FIG. 1, the protective layer 11 is interposed between the container 13 and the ultrasonic transducer 10. The protective layer 11 is fixed to the ultrasonic transducer 10. In other words, the protective layer 11 is not attached or detached from the ultrasonic transducer 10. Therefore, contact or collision between the container 13 and the ultrasonic transducer 10 can be avoided during attachment/detachment work. Therefore, risks such as wear and damage of the ultrasonic transducer 10 can be avoided. Further, as illustrated in FIG. 1, the contact medium 12 is applied not to the ultrasonic transducer 10 but to the protective layer 11. Therefore, it is possible to avoid the risk of wear and damage due to repeated application or the contact medium 12 to the ultrasonic transducer 10. That is, even when the container 13 is detachable from the ultrasonic transducer holder 101, damage to the ultrasonic transducer 10 can be suppressed.

Further, the protective layer 11 has a function of transmitting the ultrasonic waves output by the ultrasonic transducer 10 to the container 13. As a result, ultrasonic waves can be applied to the container 13 without bringing the ultrasonic transducer 10 and the container 13 into direct contact with each other.

It is preferable to use a piezoelectric ceramic transducer for the ultrasonic transducer 10 from the viewpoint of high electromechanical conversion efficiency and easy control with an electrical signal. Piezoelectric ceramics have many variations in size, and from the viewpoint of selecting an appropriate size for the ultrasonic transducer 10, it is advantageous to use piezoelectric ceramics. The protective layer 11 is required to have a function of protecting the ultrasonic transducer 10 and a function of fixing and holding the ultrasonic transducer 10. Therefore, it is preferable to use a material that provides high rigidity. In addition, the protective layer 11 is required to have the property of efficiently transmitting ultrasonic waves. From these points of view, the protective layer 11 is preferably made of a metal material. Moreover, considering durability, weight, and the like, it is particularly preferable that the protective layer 11 is made of stainless steel, aluminum, or an alloy thereof. When transmitting ultrasonic waves to the container 13 through the protective layer 11, the ultrasonic waves may be attenuated in the protective layer 11. However, when the degree of attenuation is small, the output of the ultrasonic transducer 10 can be set higher than in the case where the protective layer 11 is not provided, in consideration of the degree of attenuation, so that correct analysis can be performed.

The protective layer 11 and the ultrasonic transducer 10 are adhesively fixed via an adhesive 15. Considering the transmission of ultrasonic waves from the ultrasonic transducer 10 to the protective layer 11, an attachment surface 10A facing the protective layer 11 of a plurality of surfaces of the ultrasonic transducer 10 and a first surface 11A of the protective layer 11 are preferably as smooth surfaces as possible. However, when the adhesive 15 is interposed between the ultrasonic transducer 10 and the protective layer 11, even when the first surface 11A and the attachment surface 10A each have slight unevenness, the adhesive 15 is embedded in this unevenness. Therefore, the transmission characteristics of ultrasonic waves from the ultrasonic transducer 10 to the protective layer 11 can be improved. As a modification example of the embodiment illustrated in FIG. 1, a non-adhesive contact medium can be used in place of the adhesive 15, similarly to the contact medium 12. In this case, other means (for example, a fixing method similar to a pressing structure 14 described below) for fixing the ultrasonic transducer 10 and the protective layer 11 is required, but it is possible to improve transmission characteristics of ultrasonic waves from the ultrasonic transducer 10 to the protective layer 11. Considering the transmission of ultrasonic waves from the ultrasonic transducer 10 to the protective layer 11 and the transmission of ultrasonic waves from the protective layer 11 to the container 13, the first surface 11A and a second surface 11B of the protective layer 11 are preferably flat surfaces (surfaces that are not curved; plane). Also, the first surface 11A and the second surface 11B of the protective layer 11 are preferably parallel to each other. However, as a modification example, one or both of the first surface 11A and the second surface 11B of the protective layer 11 may not be planar. Moreover, as another modification example, the first surface 11A and the second surface 11B of the protective layer 11 may not be arranged in parallel.

The contact medium 12 for transmitting ultrasonic waves from the protective layer 11 fixed to the ultrasonic transducer 10 to the container 13 is also called an ultrasonic couplant. The contact medium 12 is preferably a liquid or sol substance. A gel may be used as the contact medium 12, but a liquid or a sol is preferable from the viewpoint of making the thickness of the contact medium 12 thin or of facilitating the suppression of inclusion of air bubbles. Further, when the contact medium 12 is supplied through pores as a method of applying the contact medium 12, which will be described below, it is particularly preferable that the contact medium 12 is a liquid or a sol. Examples of the contact medium 12 include water, oil, glycerol, and the like.

A constituent material of the container 13 for containing the liquid sample 201 is desirably one that easily transmits a light ray used in spectroscopic analysis. Moreover, it is more desirable that the constituent material of the container 13 is chemically stable and has mechanical strength and heat resistance. Generally, as the container 13, what is called a spectroscopic analysis cell or cuvette is used. Examples of constituent materials for the cell and cuvette include quartz, glass, acrylic resin, polystyrene resin, and polycarbonate resin, and from these materials, a suitable material can be selected according to the type of the liquid sample 201 from the viewpoint of the above-described light transmittance, chemical stability, mechanical strength, heat resistance, and the like. In the example illustrated in FIG. 1, the container 13 has an inlet 131 which is a supply portion for feeding (supplying) the liquid sample 201 and an outlet 132 which is a discharge portion for discharging the liquid sample 201, so that the liquid sample 201 can flow. The container 13 through which the liquid sample 201 can flow as illustrated in FIG. 1 is called a flow cell. In the example illustrated in FIG. 1, an inlet 131 is arranged below the container 13, and an outlet 132 is arranged above the container 13. Although not illustrated, as a modification example to FIG. 1, when the liquid sample 201 is stored in the container 13 without flowing, there is also a form in which a supply port and a discharge port are shared. From the viewpoint of suppressing air bubbles from remaining in the container 13, it is preferable to arrange the inlet 131 below the container 13 as illustrated in FIG. 1.

Further, the container 13 has a side surface 13A facing the second surface 11B of the protective layer 11. The side surface 13A is a surface that is pressed against the protective layer 11 via the contact medium 12, and is typically a flat surface (a non-curved surface). When the second surface 11B of the protective layer 11 and the side surface 13A of the container 13 are each flat and face each other, the transmission characteristics of ultrasonic waves from the protective layer 11 to the container 13 can be improved.

As illustrated in FIG. 2, in the case of the ultrasonic transducer holder 101 of the embodiment, the planar size of the protective layer 11 is larger than the planar size of the ultrasonic transducer 10 in a side view (planar view). As illustrated in FIG. 3, the protective layer 11 has a fixing region 11R1 to which the ultrasonic transducer 10 (see FIG. 1) is fixed via the adhesive 15 (see FIG. 1). The fixing region 11R1 can be defined as a region extending the plane (attachment surface 10A) of the ultrasonic transducer 10 illustrated in FIG. 1 in a normal direction (Y direction illustrated in FIG. 1). Although the fixing region 11R1 and a peripheral region 11R2 will be described below, each of the fixing region 11R1 and the peripheral region 11R2 will be described not as a plane but as a three-dimensional portion extending in the Y direction illustrated in FIG. 1. In the protective layer 11, the fixing region 11R1 includes a region to which the adhesive 15 adheres and a region to which the attachment surface 10A of the ultrasonic transducer 10 faces without the adhesive 15 intervening. When the adhesive 15 is applied to an outer edge of the fixing region 11R1, the adhesive 15 adheres to the entirety of the fixing region 11R1. The protective layer 11 also includes the peripheral region 11R2 around the fixing region 11R1. Although the peripheral region 11R2 is not a region that directly contributes to the fixation of the ultrasonic transducer 10, the peripheral region 11R2 has a function as a support structure for supporting the ultrasonic transducer 10, or a structure for fixing the ultrasonic transducer holder 101 (see FIG. 1) itself to a device (not illustrated) or an optical table. The fixing region 11R1 is required to have ultrasonic transmission characteristics. Further, the peripheral region 11R2 is required to have such rigidity that it is difficult to deform due to external force and its own weight.

A thickness (length in the Y direction) of the protective layer 11 illustrated in FIG. 1, especially the thickness of the fixing region 11R1 (see FIG. 3) of the protective layer 11, is preferably an integer multiple of half the wavelength of the ultrasonic waves in the protective layer 11 in order for the protective layer 11 to resonate with the ultrasonic transducer 10. Although the wavelength of the ultrasonic wave is changed according to an analysis target object and the purpose of analysis, for example, when the propagation speed of ultrasonic waves in stainless steel is about 5700 m/sec and the frequency of ultrasonic waves is 2 MHz (megahertz), the length of one wavelength is about 2.8 mm, and the length of a half wavelength is about 1.4 mm. When the thickness of the protective layer 11 is extremely thin, problems arise such as difficulty in processing or easy deformation due to low rigidity. Therefore, it is preferable that the thickness of the fixing region 11R1 of the protective layer 11 be 0.5 times or more the half wavelength of the ultrasonic wave in the protective layer 11. Also, the greater the thickness of the fixing region 11R1 of the protective layer 11, the greater the possibility that the degree of attenuation of ultrasonic waves in the protective layer 11 will increase. Therefore, the thickness of the fixing region 11R1 of the protective layer 11 is preferably ten times or less the half wavelength of the ultrasonic wave in the protective layer 11. That is, the thickness (for details, the thickness of the fixing region 11R1 in a direction of the extension of the attachment surface 10A of the ultrasonic transducer in the normal direction of the protective layer 11) of the protective layer 11 is preferably 0.5 times or more and 10 times or less of the half wavelength of the ultrasonic wave in the protective layer 11.

Although details will be described below as a modification example, the transmission characteristics of ultrasonic waves in the protective layer 11 are more affected by the thickness of the fixing region 11R1 than the thickness of the peripheral region 11R2. Therefore, a structure in which the fixing region 11R1, which has a large influence on the transmission characteristics of the ultrasonic waves, is selectively thin in the protective layer 11, and the peripheral region 11R2 (see FIG. 3), which requires high rigidity as a support structure, is thicker than the fixing region 11R1 is preferable.

Also, as illustrated in FIG. 1, the ultrasonic transducer holder 101 has a fixing structure that fixes the container 13. In the example illustrated in FIG. 1, the pressing structure (pressing member) 14 that presses the container 13 toward the second surface 11B of the protective layer 11 from a surface of the container 13 opposite to the side surface 13A is adopted as a fixing structure. The pressing structure 14 illustrated in FIG. 1 has a mechanism for pressing the container 13 in a direction (hereinafter referred to as a -Y direction) opposite to the Y direction illustrated in FIG. 1. The container 13 has a pressed surface 13B on an opposite side of the side surface 13A. The pressing structure 14 has a mechanism for pressing the pressed surface 13B of the container 13 in the direction (hereinafter referred to as the -Y direction) opposite to the Y direction. The container 13 pressed by the pressing structure 14 is pressed against the second surface 11B of the protective layer 11 via the contact medium 12. The side surface 13A of the container 13 pressed against the protective layer 11 is typically planar.

The fixing structure for fixing the container 13 to the protective layer 11 via the contact medium 12 must make the container detachable. Therefore, this fixing structure does not adhere and fix the protective layer 11 and the container 13 with the adhesive 15, but fixes the container 13 so that it is not displaced during use. A metal plate, a metal block, a metal rod, a spring, a bolt, a rubber plate, a resin plate, a resin block, a resin rod, and the like can be exemplified as the pressing structure 14 as an example of the fixing structure. Alternatively, a structure obtained by combining the members described above can be used as the pressing structure 14. As a mechanism for pressing the container 13 by the pressing structure 14, the following method can be exemplified. For example, there is a method of pressing the container 13 against the protective layer 11 by bringing a bolt screwed into a support plate (not illustrated) into contact with the container 13, turning the bolt in this state to protrude in the -Y direction. In this case, by rotating the bolt in an opposite direction, a pressing force on the container 13 can be removed and the container 13 can be separated from the ultrasonic transducer holder 101. Alternatively, for example, there is a method in which the pressing structure 14 formed of a metal plate, a metal block, a metal rod, a spring, a bolt, a rubber plate, a resin plate, a resin block, a resin rod, and the like is brought into contact with the container 13 and the container 13 is pressed and fixed against the protective layer 11 using the elasticity of the material forming the pressing structure 14 or the reaction of force. Examples of a driving force for pressing the pressing structure 14 against the container 13 include air pressure, water pressure, hydraulic pressure, and electromagnetic force.

The fixing structure for fixing the container 13 includes various modification examples other than the pressing structure 14 illustrated in FIG. 1. The fixing structure should be able to bring the container 13 and the ultrasonic transducer holder 101 into close contact and separate them. For example, although illustration is omitted, as a modification example to FIG. 1, in some cases, the protective layer 11 and the ultrasonic transducer 10 of the ultrasonic transducer holder 101 and the container 13 are independently held and independently transportable by a transport mechanism portion. In the case of this modification example, the container 13 and the ultrasonic transducer holder 101 can be brought into close contact with each other by operating the transport mechanism portion, and can be separated from each other, so that it can be used as a fixing structure.

Modification Example of Protective Layer Structure

FIG. 4 is a front view of an ultrasonic transducer holder having a modification example of the protective layer illustrated in FIG. 1 and a container. FIG. 5 is a cross-sectional view illustrating a cross section cut parallel to the X-Y plane along the line A-A illustrated in FIG. 4. In the case of the modification example illustrated in FIGS. 4 and 5, the modification example differs from the embodiment illustrated in FIG. 1 in that a thickness 11T1 (see FIG. 4) of the fixing region 11R1 of the protective layer 11 is thinner than a thickness 11T2 of the peripheral region 11R2.

Specifically, as illustrated in FIG. 5, the protective layer 11 has a recess portion (groove, hole) 11H formed at a position overlapping the fixing region 11R1. The recess portion 11H is a hole dug from the first surface 11A side of the protective layer 11 toward the second surface 11B side. The recess portion 11H does not penetrate the protective layer 11 in a thickness direction (a direction from one of the first surface 11A and the second surface 11B to the other). A bottom surface 11G of the recess portion 11H is typically flat. At least a part of the ultrasonic transducer 10 is inserted into the recess portion 11H and adhered and fixed to the bottom surface 11G of the recess portion 11H via the adhesive 15 (see FIG. 4). In addition, when the first surface 11A is not a flat surface as in this modification example, the bottom surface 11G can be regarded as a part of the first surface 11A of the protective layer 11. In this case, the thickness 11T1 (see FIG. 4) of a portion interposed between the bottom surface 11G and the second surface 11B is thinner than the thickness 11T2 of a portion belonging to the peripheral region 11R2. The portion interposed between the bottom surface 11G and the second surface 11B includes the entirety of the fixing region 11R1. The fixing region 11R1 is defined as a region that extends the attachment surface 10A of the ultrasonic transducer 10 in the normal direction. Therefore, considering the clearance for inserting the ultrasonic transducer 10 into the recess portion 11H, strictly speaking, the bottom surface 11G includes the entirety of the fixing region 11R1 and a part of the peripheral region 11R2. However, of the bottom surface 11G, an area of the portion belonging to the peripheral region 11R2 is so small that it can be ignored compared to an area of the portion belonging to the fixing region 11R1. Therefore, substantially, the bottom surface 11G of the recess portion 11H can be regarded as belonging to the fixing region 11R1.

In the case of this modification example, of the protective layer 11, the thickness 11T1 (see FIG. 4) of the fixing region 11R1 that contributes to the transmission of ultrasonic waves is thinner than the thickness of the peripheral region 11R2, so the degree of attenuation of ultrasonic waves by the protective layer 11 can be reduced. Also, the thickness 11T2 of the peripheral region 11R2 of the protective layer 11 can be increased. For example, in the case of this modification example, the peripheral region 11R2 of the protective layer 11 is arranged like a frame around the ultrasonic transducer 10. As a result, the rigidity of the entirety of the ultrasonic transducer holder 101 including the ultrasonic transducer 10 and the protective layer 11 can be increased. The surface condition of the bottom surface 11G to which the ultrasonic transducer 10 is attached is preferably a flattened surface. However, as described above, when the adhesive 15 (see FIG. 4) intervenes between the attachment surface 10A of the ultrasonic transducer 10 and the bottom surface 11G, since the adhesive 15 is embedded even when there is some surface roughness, it is possible to suppress deterioration in the transmission characteristics of ultrasonic waves due to the rough surface condition.

Supply of Contact Medium and Placement of Container

Next, a method of supplying the contact medium 12, a method of fixing the container 13, and a structure of each component of the ultrasonic transducer holder suitable for these processes illustrated in FIG. 1 or FIG. 4 will be described. FIG. 6 is a plan view illustrating the second surface of the protective layer illustrated in FIG. 3. FIG. 6 is a plan view illustrating the second surface 11B of the protective layer 11. In FIG. 6, in order to show a planar positional relationship between the fixing region 11R1 illustrated in FIG. 3 and an application region 12R illustrated in FIG. 6, a region (a region corresponding to the fixing region 11R1 in FIG. 3) where a space obtained by extending the ultrasonic transducer 10 in the normal direction and the second surface 11B intersect is indicated by a two-dot chain line as a fixing region 11R3. As described above, each of the fixing region 11R1 and the peripheral region 11R2 is defined not as a plane but as a three-dimensional portion extending in the Y direction illustrated in FIG. 1, but the region 11R3 is defined as a surface of the region 11R1 that intersects the second surface 11B.

For the contact medium 12 illustrated in FIGS. 1 and 4, it is necessary to supply (apply) the contact medium 12 to the application region 12R illustrated in FIG. 6. The application region 12R is a region to which the contact medium 12 is to be supplied, and a slight error is allowed between it and a region where the contact medium 12 is actually arranged. In the example illustrated in FIG. 6, the second surface 11B of the protective layer 11 is provided with an application region mark 20 that is a mark indicating the application region 12R of the contact medium 12 (see FIG. 1). Since the protective layer 11 is provided with the application region mark 20, when a supply position of the contact medium 12 is displaced, it is possible to visually (optically when using an image sensor, or the like) detect the occurrence of the displacement and the degree of the displacement.

Various methods are conceivable as long as the application region mark 20 can be visually (optically) recognized when the supply position of the contact medium 12 is displaced. For example, a method of thinly shaving the second surface 11B of the protective layer 11 along an outer edge of the application region 12R to form a marking line can be exemplified. Alternatively, a method of forming the application region mark 20 by printing it on the second surface 11B may be applied. In the case of the method using printing, compared with the method of forming the marking line, the unevenness of the second surface 11B of the protective layer 11 can be kept small, so it is preferable from the viewpoint of suppressing the deterioration of the transmission characteristics of ultrasonic waves.

Also, there are various examples of the shape of the application region mark 20. For example, FIG. 6 illustrates an example in which the application region mark 20 having a frame shape is formed along the outer edge of the application region 12R. In addition, the application region mark 20 may be partially formed along the outer edge of the application region 12R. As an example of this method, for example, when the outer edge of the application region 12R forms a quadrangle, a method of forming the application region mark 20 at least at two or more diagonal corners of four corners of the quadrangle, a method of forming the application region mark 20 on each of the four sides, or a method of forming the application region marks 20 on, in addition to the four corners, each side between adjacent corners can be exemplified.

The contact medium 12 illustrated in FIGS. 1 and 4 is applied within a range of the application region mark 20 illustrated in FIG. 6. As an application method, for example, there is a method in which the contact medium 12 (see FIG. 1) is spread and applied onto the second surface 11B of the protective layer 11 using an application jig such as a brush, a cotton swab, a cloth, or a roller. As another application method, the contact medium 12 may be applied by flowing or spraying it from a nozzle (not illustrated). As another application method, there is a method or transferring the contact medium 12 by attaching a plate-shaped transfer jig having a transfer surface pre-coated with the contact medium 12 to the application region 12R. Alternatively, a sponge impregnated with the contact medium 12 may be used as the transfer jig described above.

As illustrated in FIG. 6, the application region 12R is a region that includes the region 11R3 where the space obtained by extending the ultrasonic transducer 10 (see FIG. 1; the attachment surface 10A of the ultrasonic transducer 10 for details) in the normal direction and the second surface 11B intersect. Ultrasonic waves are transmitted from the fixing region 11R1 (see FIG. 3) and transmitted from the protective layer 11 to the container 13 (see FIG. 1) via the application region 12R. Therefore, as illustrated in FIG. 6, by arranging the application region 12R at a position that includes the fixing region 11R3, which is the surface opposite to the fixing region 11R1, the transmission path of the ultrasonic waves can be arranged linearly. As a modification example to FIG. 6, a part of the fixing region 11R3 may not be included in the application region 12R. However, from the viewpoint of efficient transmission of ultrasonic waves, it is particularly preferable that the entirety of the fixing region 11R3 be included in the application region 12R as illustrated in FIG. 6.

In addition, focusing on a traveling direction (the Y direction in the example illustrated in FIG. 6) of the ultrasonic waves output by the ultrasonic transducer 10 illustrated in FIGS. 1 and 4, the configuration illustrated in FIG. 6 can be expressed as follows. That is, the application region 12R is a region that includes a region (fixing region 11R3) where the space extending the ultrasonic transducer 10 (see FIG. 1) and the second surface 11B intersect in the traveling direction of ultrasonic waves. In this case, similarly to the expression described above, the transmission path of the ultrasonic waves can be arranged linearly, so that the transmission of the ultrasonic waves can be made more efficient.

FIG. 7 is a plan view illustrating a second surface of a protective layer of the ultrasonic transducer holder which is a modification example to FIG. 6. FIG. 8 is an explanatory view illustrating steps of fixing the container to the ultrasonic transducer holder provided with the protective layer illustrated in FIG. 7. FIG. 9 is an explanatory view illustrating steps that are a modification example to FIG. 8.

In an example illustrated in FIGS. 7 to 9, an ultrasonic transducer holder 101A (see FIGS. 8 and 9) differs from the ultrasonic transducer holder 101 illustrated in FIGS. 1 and 4 in that it has a guide member 21 that guides the fixing of the container 13 (see FIGS. 8 and 9) to the application region 12R (see FIG. 7). In FIGS. 8 and 9, illustration of the inlet 131 and the outlet 132 illustrated in FIG. 1 is omitted. In the example illustrated in FIGS. 8 and 9, the liquid sample 201 illustrated in FIG. 1 is not illustrated because the container 13 is fixed before the liquid sample 201 illustrated in FIG. 1 is supplied into the container 13.

In the case of the ultrasonic transducer holder 101A, the contact medium 12 is applied in advance on the second surface 11B of the protective layer 11 as illustrated in FIG. 8, for example. Then, the container 13 is pressed against the protective layer 11 along the guide member 21. Alternatively, as illustrated in FIG. 9, the contact medium 12 is applied in advance onto the side surface 13A of the container 13. Then, the container 13 is pressed against the protective layer 11 along the guide member 21. In the case of the example illustrated in FIG. 9, it is preferable that the container 13 have an application region mark. The method of applying the contact medium 12 to the container 13 is the same as the method of applying the contact medium 12 to the application region 12R of the protective layer 11 described with reference to FIG. 6.

In this modification example, the guide member 21 is fixed to the protective layer 11. Since the ultrasonic transducer holder 101 is provided with the guide member 21, it is possible to improve the accuracy of the position to which the container is pressed, thereby preventing displacement of the container 13 due to repeated mounting work. In addition, when the guide member 21 is used, there is no need for visual trial and error in the work of pressing the container 13. Therefore, the work of pressing the container 13 can be made more efficient.

In the example illustrated in FIG. 7, the guide member 21 is an L-shaped metal fitting. However, when the guide member 21 is made of a material that can guide the position of the container 13 when the container 13 is pressed against the protective layer 11, there are various modification examples in its shape and fixing position. For example, as a modification example of the shape of the guide member 21, a pin having a shape such as a U shape, a cylindrical shape, or a prism shape can be exemplified. As for the fixing positions of the guide members 21, it is preferable that at least one or more guide members 21 be fixed around the application region 12R illustrated in FIG. 7. Moreover, from the viewpoint of improving the alignment accuracy, it is preferable that a plurality of guide members 21 be formed around the application region 12R. However, for example, from the viewpoint of improving the versatility of the types of the containers 13 that can be fixed, it is preferable that the number of portions of which positions are restricted by the guide members 21 is small. Therefore, for example, as illustrated in FIG. 7, when the application region 12R forms a quadrangle in a plan view, for example, a structure in which the guide members 21 are respectively fixed to the corners at both ends of one side of the quadrangle and the guide members 21 are not fixed to an opposite side is also conceivable. In this case, the degree of freedom in selecting the container 13 is improved.

Further, FIGS. 10 and 11 illustrate a modification example of the guide member 21. FIG. 10 is a front view illustrating a configuration example of an ultrasonic transducer holder that is a modification example to FIGS. 8 and 9. FIG. 11 is a cross-sectional view illustrating a cross-section cut parallel to the X-Y plane along line A-A of FIG. 10. The ultrasonic transducer holder 101B illustrated in FIG. 10 is different from the ultrasonic transducer holder 101A illustrated in FIG. 8 in that the guide member 21 includes a recess portion 21A formed from the second surface 11B of the protective layer 11 toward the first surface 11A, and a convex portion 21B formed on the side surface 13A of the container 13. The recess portion 21A and the convex portion 21B have mutually corresponding shapes (shapes that can be engaged with a clearance that allows the convex portion 21B to be inserted into the recess portion 21A). When the side surface 13A of the container 13 is pushed toward the second surface 11B or the protective layer 11, as schematically illustrated with an arrow in FIG. 11, the convex portion 21B is inserted into the recess portion 21A. As a result, the container 13 and the protective layer 11 can be aligned with high accuracy in the same manner as the guide member 21 described with reference to FIGS. 8 and 9. In addition, in the case of this modification example, alignment work can be performed efficiently.

Focusing on the shape of the container 13, the modification example illustrated in FIGS. 10 and 11 can be expressed as follows. That is, the container 13 has a shape (convex portion 21B) corresponding to the shape of the guide member (recess portion 21A). In FIGS. 10 and 11, an example in which the rectangular parallelepiped convex portion 21B is formed on the container 13 and the rectangular parallelepiped recess portion 21A formed on the protective layer 11 is described, but there are various modification examples of the method of positioning the container 13 according to the shapes of the container 13 and the protective layer 11. For example, the convex portion 21B and the recess portion 21A may have various shapes such as a rectangular parallelepiped shape, a prism, a cylinder, a pyramid, and a hemisphere. In some cases, the convex portion 21B may be formed on the second surface 11B side of the protective layer 11 and the recess portion 21A corresponding to the convex portion 21B may be formed on the side surface 13A side of the container 13. Moreover, as illustrated in FIGS. 8 and 9, also when each of the second surface 11B of the protective layer 11 and the side surface 13A of the container 13 is a flat surface, it can be considered as one aspect indicating that the shape of the side surface 13A of the container 13 is a shape corresponding to the shape of the application region 12R of the protective layer 11. Further, as another modification example, the recess portion 21A may be formed on the pressing structure 14 side.

By utilizing the application region mark 20 illustrated in FIG. 6 and the guide member 21 illustrated in FIGS. 7 to 11, the contact medium 12 (see FIGS. 8 to 11) can be reliably interposed between the application region 12R (see FIGS. 6 and 7) of the protective layer 11 and the container 13. Although it is preferable that the entirety of the side surface 13A of the container 13 be fixed to the application region 12R, when at least a part of the side surface 13A is fixed to the application region 12R, ultrasonic waves are transmitted into the container 13 through the part fixed to the application region 12R.

Modification Examples of Contact Medium Supply

Next, modification examples of the method of supplying the contact medium 12 will be described. FIG. 12 is a front view illustrating a protective layer provided in a modification example of the ultrasonic transducer holder illustrated in FIG. 1 and a container fixed in a vicinity of the protective layer. FIG. 13 is a top view schematically illustrating how a contact medium is supplied to a recess of the protective layer illustrated in FIG. 12. FIG. 14 is a front view illustrating a modification example to FIG. 12. FIG. 15 is a top view schematically illustrating how a contact medium is supplied to a recess of a protective layer illustrated in FIG. 14. In FIGS. 12 to 15, an outline of a recess 31 formed in the second surface 11B of the protective layer 11 and a plurality of pores 32 communicating from the surface of the protective layer 11 to the recess 31 are indicated by dotted lines.

Each of an ultrasonic transducer holder 101C illustrated in FIGS. 12 and 13 and an ultrasonic transducer holder 101D illustrated in FIGS. 14 and 15 differs from the ultrasonic transducer holder 101 illustrated in FIG. 1 in that it has the recess 31 and the pores 32 for supplying the contact medium 12. Each of the ultrasonic transducer holder 101C and the ultrasonic transducer holder 101D has a first pore 32A (see FIGS. 13 to 15) for filling the contact medium 12 (see FIGS. 13 and 14), and the recess 31 in contact with the second surface 11B of the protective layer 11 and designed to be filled with the contact medium 12 as the application region 12R. By supplying the contact medium 12 to the recess 31 through the first pore 32A, the contact medium 12 can be accurately supplied to the correct position even without the application region mark 20 (see FIG. 6).

Further, each of the ultrasonic transducer holder 101C and the ultrasonic transducer holder 101D has a second pore 32B for discharging the air (gas) or contact medium 12 remaining in the recess. By having the second pore 32B as a discharge port in addition to the first pore 32A as a supply port, the generation of air bubbles in a space surrounded by the recess 31 and the container 13 can be suppressed. The examples illustrated in FIGS. 12 to 15 show examples in which the contact medium 12 is supplied after the container 13 is pressed. However, as a modification example, the container 13 may be pressed after the recess 31 is filled with the contact medium 12.

The protective layer 11 provided in each of the ultrasonic transducer holder 101C and the ultrasonic transducer holder 101D has a third surface (side surface) 11C continuous with the second surface 11B, a fourth surface (side surface) 11D opposite to the third surface, the second surface 11B, a fifth surface (upper surface) 11E continuous with the third surface 11C and the fourth surface 11D, and a sixth surface (lower surface) 11F opposite to the fifth surface 11E.

The recess 31 is a recess portion provided on the second surface 11B of the protective layer 11. It is preferable that an opening area (an area of the opening in the second surface 11B) of the recess 31 be equal to or larger than an area of a region in the container 13 where it is desired to form an aggregation layer by ultrasonic waves. For example, the container 13 is a cell for spectroscopic analysis, an outer thickness (a length of the container 13 in the X direction, in other words, a distance from a position where a light beam from a light source is incident on the container 13 to a position where the light beam is emitted from the container 13) of the container 13 is 3 mm, a total height is 45 mm, an optical path length (a distance that the light beam from the light source passes through the liquid sample 201 in the container 13) is 1 mm, and a length of the aggregation layer in the container 13 in the Z direction (height direction) is 10 mm. In this case, an opening portion of the recess 31 preferably has a width (length in the X direction) of 1 mm to 3 mm and a length in a height direction (Z direction) of 10 mm to 45 mm. Further, a depth (length in the Y direction) of the recess 31 is preferably as shallow as possible within a range where the contact medium 12 can flow. For example, the depth of the recess 31 is preferably in a range of 0.01 mm to 0.5 mm.

Further, a pore size of each of the plurality of pores 32 including the first pore 32A and the second pore 32B can be determined in consideration of the workability of forming pores and the fluidity of the contact medium 12. For example, the pore size of each of the plurality of pores 32 is within a range of 0.1 mm to 1 mm.

In the case of the ultrasonic transducer holder 101C illustrated in FIGS. 12 and 13, on the third surface 11C of the protective layer 11, end portions of the plurality of first pores 32A are exposed, and on the fourth surface 11D, end portions of the plurality of second pores 32B are exposed. Each of the plurality of first pores 32A and second pores 32B extends along the X-Y plane. An injector 33 and a pressure sensor 34 are connected to each of the plurality of first pores 32A via a pipe 35. The pipe 35 for discharge is connected to each of the plurality of second pores 32B. In the case of the ultrasonic transducer holder 101C, since the plurality of first pores 32A and the plurality of second pores 32B are arranged along a longitudinal direction of the recess 31, filling unevenness in the recess 31 can be reduced.

On the other hand, in the case of the ultrasonic transducer holder 101D illustrated in FIGS. 14 and 15, on the fifth surface 11E of the protective layer 11, an end portion of the first pore 32A is exposed, and on the sixth surface 11F, an end portion of the second pore 32B is exposed. An injector 33 and a pressure sensor 34 are connected to the first pore 32A through a pipe 35. Also, the pipe 35 for discharge is connected to the second pore 32B. Since the number of pores 32 can be reduced in the case of the ultrasonic transducer holder 101D, processing efficiency can be improved.

As a modification example to FIGS. 12 to 15, there is a case where the pores 32 may be provided on the first surface 11A (see FIG. 1) and the second surface 11B, However, from the viewpoint of not placing restrictions on the placement of the ultrasonic transducer 10 (see FIG. 1) and the container 13, as illustrated in FIGS. 12 to 15, the pores 32 are preferably provided on any one of the third surface 11C to the sixth surface 11F.

Modification Example of Method of Pressing Container

Next, a modification example of the method of pressing the container 13 will be described. FIG. 16 is an explanatory view illustrating a modification example of a container fixing method illustrated in FIG. 9. FIG. 17 is an explanatory view illustrating another modification example of the container fixing method illustrated in FIG. 9.

The method illustrated in FIG. 16 has a process of moving the container 13 obliquely downward while bringing the container 13 into contact with a roller 41 to which the contact medium 12 is adhered. In other words, in the method illustrated in FIG. 16, the container 13 is moved in a direction (−Z direction) opposite to the Z direction in a state where the container 13 is inclined with respect to an X-Z plane while the container 13 is brought into contact with the roller 41 to which the contact medium 12 is adhered. Through this process, the contact medium 12 is applied to the container 13.

In addition, the method illustrated in FIG. 16 has a process of applying the contact medium 12 to the container 13 and then pressing a surface of the container 13 coated with the contact medium 12 against the second surface 11B of the protective layer 11. In this process, the pressing structure 14 presses the pressed surface 13B of the container 13, for example. When the container 13 is inclined with respect to the X-Z plane, the container 13 is pressed against the protective layer 11 while rotating around a position where the container 13 and the protective layer 11 are in contact with each other. In this process, for example, the container 13 may be manually pressed against the protective layer 11, and the pressing structure 14 may be used when the container 13 is finally fixed.

The method illustrated in FIG. 17 has a process of moving a nozzle 42 obliquely downward (−Z direction when inclined with respect to the X-Z plane) while applying the contact medium 12 to the container 13 from the nozzle 42 that ejects (injects, in some cases) the contact medium 12. Through this process, the contact medium 12 is applied to the container 13.

Also, similar to the method illustrated in FIG. 16, the method illustrated in FIG. 17 has a process of applying the contact medium 12 to the container 13 and then pressing a surface of the container 13 coated with the contact medium 12 against the second surface 11B of the protective layer 11. This process is the same as the process described with reference to FIG. 16, so redundant description will be omitted. In addition, in the case of the method illustrated in FIG. 17, while the contact medium 12 is being ejected from the nozzle 42, the container 13 may be pressed against the protective layer 11 while rotating around a position where the container 13 and the protective layer 11 are in contact with each other. In this case, the entirety of the contact medium 12 is in contact with the protective layer 11 immediately after the application of the contact medium 12 is completed.

In the case of the fixing method of the container 13 illustrated in FIGS. 16 and 17, it is different from the embodiment illustrated in FIG. 9 in that the container 13 is pushed against the second surface 11B of the protective layer 11 while rotating from an inclined state. This method is preferable in that air bubbles are less likely to remain in the contact medium 12. Moreover, in the case of the fixing method of the container 13 illustrated in FIGS. 16 and 17, by applying the contact medium 12 using a contact medium supply device such as the roller 41 (see FIG. 16) or the nozzle 42 (see FIG. 17), unevenness in application is less likely to occur than in the case of manual application. Therefore, the in-plane uniformity of the contact medium 12 can be ensured, and the transmission characteristics of ultrasonic waves can be improved. Although illustration is omitted in FIGS. 16 and 17, the technique using the guide member 21 described with reference to FIG. 9 and the like may be combined and applied.

Analysis System

Next, an analysis system using the above-described ultrasonic transducer holder will be described. An analysis system using the ultrasonic transducer holder 101 illustrated in FIG. 1 will be described below as a representative example of the analysis system, but various modification examples described above are applicable. FIG. 18 is an explanatory view (front view) illustrating a configuration example of the analysis system using the ultrasonic transducer holder illustrated in FIG. 1. FIG. 19 is a side view of the ultrasonic transducer holder illustrated in FIG. 18 as viewed from the ultrasonic transducer side.

As illustrated in FIGS. 18 and 19, an analysis system 300 of the embodiment includes the ultrasonic transducer holder 101, an oscillator 50 (see FIG. 18) that applies voltage to the ultrasonic transducer 10, a light source 51 (see FIG. 19) that irradiates the container 13 with light rays, a light receiving portion 52 that receives light rays transmitted through the container 13, and a computer 53 that analyzes the liquid sample 201 based on the light rays received by the light receiving portion 52.

In the example illustrated in FIG. 19, the analysis system 300 has the oscillator 50, the light source 51, the light receiving portion 52, the computer 53, and a spectroscopic analysis portion (spectroscopic analysis device) 54. In FIG. 19, the computer 53 and the spectroscopic analysis portion 54 are illustrated separately. However, the function of the spectroscopic analysis portion 54 can also be considered as a part of the computer 53, as illustrated in parentheses in FIG. 19.

The container 13 has the inlet 131 for feeding the liquid sample 201 and the outlet 132 for discharging the liquid sample 201. The light source 51 and the light receiving portion 52 are arranged so as to pinch the container 13. A light beam 55 output from the light source 51 passes through the container 13 and reaches the light receiving portion 52. The light source 51 and the light receiving portion 52 are electrically connected with the spectroscopic analysis portion 54. Also, the spectroscopic analysis portion 54 is electrically connected to the computer 53. Alternatively, the spectroscopic analysis portion 54 is a part of the computer. The spectroscopic analysis portion 54 as a part of the computer 53 controls the wavelength of the light ray output from the light source 51 and measures the intensity, absorbance, or spectrum of the light ray based on the light ray received by the light receiving portion 52.

As a modification example, the light source 51 and the light receiving portion 52 may each be accommodated in the spectroscopic analysis portion 54 and each connected to an optical fiber. In this modification example, an optical fiber connected to the light source 51 and an optical fiber connected to the light receiving portion 52 are arranged to face each other via the container 13. A light ray output to the container 13 emitted from the optical fiber connected to the light source 51, and the light ray transmitted through the container 13 is received by the optical fiber connected to the light receiving portion 52. Moreover, as another modification example, there may be a structure in which the ultrasonic transducer holder 101, the container 13, the pressing structure 14, the light source 51, the light receiving portion 52, the spectroscopic analysis portion 54, and the computer 53 are accommodated in one housing.

The oscillator 50 is a drive component that drives the ultrasonic transducer 10 with the set frequency and amplitude and causes the ultrasonic transducer 10 to emit ultrasonic waves. Although not illustrated in FIGS. 18 and 19, the oscillator 50 is preferably connected to an amplifying device such as a high frequency amplifier and a measuring device such as an oscilloscope so that an electrical signal applied to the ultrasonic transducer 10 can be amplified or measured.

Next, agglomeration of suspended matters in the liquid sample 201 suspended by irradiation of ultrasonic waves and formation of a transparent region thereby will be described. The ultrasonic waves radiated from the ultrasonic transducer 10 into the container 13 are reflected on the plane of the container 13. A standing wave is formed in the container 13 when the frequency of the ultrasonic wave is adjusted to a specific frequency. Inside the container 13, the suspended matters in the liquid sample 201 are gathered at the nodes or antinodes of the standing wave by an acoustic radiation force of the ultrasonic waves, and an aggregation layer 56 is periodically formed. Clear regions with no turbidity or low turbidity concentration are created between a plurality of aggregation layers 56 formed next to each other at the nodes or antinodes of the standing wave. The presence of this transparent region increases the intensity of transmitted light rays from the light source 51 and can improve the accuracy of optical analysis of the suspended liquid sample 201.

In this section, the analysis system for optical analysis is exemplified and described. However, the ultrasonic transducer holder 101 can be used for various analysis systems other than the optical analysis system. For example, in order to perform solid-liquid separation as a pre-analytical treatment of an analysis sample to be put into a liquid chromatograph or mass spectrometry without optical analysis, it can be used for solid-liquid separation, gas-liquid separation, or liquid-liquid separation of the liquid sample 201. Suspended matters in the liquid sample 201 are not limited to solid fine particles, and may be, for example, air bubbles, oil droplets in an aqueous solution, or a mixture thereof. According to the analysis system described in this section, the effects described in each embodiment can be obtained by using the ultrasonic transducer holder 101 or its modified ultrasonic transducer holder.

Analysis Method

Next, an analysis method using the analysis system described with reference to FIGS. 18 and 19 will be described. FIG. 20 is an explanatory view illustrating a process flow of the analysis method using the analysis system illustrated in FIGS. 18 and 19. The analysis method illustrated in FIG. 20 includes steps S101 to S110. Each step illustrated in FIG. 20 will be described below in order. In the following description of this section, the description "a mechanism controlled by the computer 53" means a robot, for example.

(Step S101: Contact Medium Application Process) An operator or a mechanism controlled by the computer 53 illustrated in FIG. 19 applies the contact medium 12 to either the application region 12R of the protective layer 11 illustrated in FIG. 6 or the side surface 13A of the container 13 illustrated in FIG. 9. The method of applying the contact medium 12 can be exemplified by the method described with reference to FIGS. 6 to 9, the method described with reference to FIGS. 12 to 15, or the method described with reference to FIGS. 16 and 17. In the method described with reference to FIGS. 12 to 15, when supplying the contact medium 12 into the recess 31 while pressing the container 13 against the protective layer 11, step S101 is performed after steps S102 and S103.

(Step S102: Container Alignment Process) The operator or the mechanism controlled by the computer 53 illustrated in FIG. 19 attaches the container 13 illustrated in FIG. 1 to the ultrasonic transducer holder 101. Since the container 13 is fixed in the next step S103, the container 13 and the ultrasonic transducer holder 101 are aligned in this process. As a method of alignment, there is a method of manual trial and error, but it is preferable to perform alignment using the guide member 21 as described with reference to FIGS. 7 to 11.

(Step S103: Container Fixing Process) The operator or the mechanism controlled by the computer 53 illustrated in FIG. 19 presses the pressing structure 14 illustrated in FIG. 1 toward the container 13 and fixes the container 13 and the ultrasonic transducer holder 101 in a state of facing each other via the contact medium 12. As a fixing method, in addition to the method of pressing in the direction along the X-Y plane using the pressing structure 14 as illustrated in FIGS. 8 and 9, the method in which the container 13 is pressed against the second surface 11B of the protective layer 11 so as to rotate from the inclined state as described with reference to FIGS. 16 and 17 can be exemplified.

(Step S104: Liquid Sample Supply Process) The operator or the mechanism controlled by the computer 53 illustrated in FIG. 19 supplies the liquid sample 201 illustrated in FIG. 1 to the container 13. The liquid sample 201 is suppled, for example, from the inlet 131 of the container 13 and filled into the container 13. In this process, for example, the liquid sample 201 is continuously supplied to maintain a fluid state in the container 13. Alternatively, as a modification example, in this process, the supply is temporarily stopped after the container 13 is filled with a required amount (preset filling amount) of the liquid sample 201. As a modification example of this process, for example, the operator may manually supply the liquid sample 201 to the container 13 with a pipette or the like. Alternatively, the mechanism controlled by the computer 53 may supply the liquid sample 201 via a liquid feeding device such as a pump.

(Step S105: Ultrasonic Oscillation Process) The computer 53 illustrated in FIG. 19 drives the oscillator 50 illustrated in FIG. 18 to cause the ultrasonic transducer 10 to oscillate ultrasonic waves. Ultrasonic waves are transmitted to the liquid sample 201 in the container 13 through the adhesive 15, the protective layer 11, the contact medium 12, and the container 13 illustrated in FIG. 1.

(Step S106: Optical Analysis Process) The computer 53 illustrated in FIG. 19 outputs the light beam 55 from the light source 51, and the light receiving portion 52 measures the received light ray. As an example of the measurement method, for example, the computer 53 sends a control signal to the spectroscopic analysis portion 54, acquires a spectrum via the light receiving portion 52, and qualitatively and quantitatively analyzes the type of component and the concentration of the component from the spectrum. The operation of the spectroscopic analysis portion 54 may be performed by an operator. During or before or after the optical analysis, a process of changing the flow rate of the liquid sample 201 in the container 13 or stopping the flow may be performed. The spectroscopic analysis portion 54 of the computer 53 performs optical analysis (for example, spectroscopic analysis described with reference to FIGS. 18 and 19) based on a measurement result. After the ultrasonic waves are oscillated in step S105, a time is required for the migration of suspended matter and the like until the aggregation layer illustrated in FIG. 18 is formed. Therefore, rather than performing step S106 immediately after starting step S105, it is preferable to provide a waiting time for waiting for the formation of the aggregation layer 56 before starting step S106. The timing of starting step S106 can be exemplified by, for example, a method of starting when the intensity of the transmitted light ray reaching the light receiving portion 52 after passing through the container 13 from the light source 51 illustrated in FIG. 19 is maximized, or a method of starting when a rate of change of the intensity of the transmitted light ray becomes equal to or less than a predetermined threshold and can be regarded as almost constant.

(Step S107: Ultrasonic Stop Process) The computer 53 illustrated in FIG. 19 stops the oscillator 50 illustrated in FIG. 18 to stop the output of ultrasonic waves.

(Step S108: Liquid Sample Replacement Process) The operator or the mechanism controlled by the computer 53 illustrated in FIG. 19 discharges the liquid sample 201 for which the analysis has been completed to the outside from the outlet 132 of the container 13 illustrated in FIG. 1, for example, and supplies a new liquid sample 201 into the container 13 as necessary. When the container 13 is used repeatedly, multiple cycles of optical analysis can be executed by repeating steps S104 to S108. On the other hand, when the container 13 is disposable (single use), the process proceeds to the next step S109.

(Step S109: Container Removal Process) The operator or the mechanism controlled by the computer 53 illustrated in FIG. 19 removes from the ultrasonic transducer holder 101 the container 13 filled with the liquid sample 201 for which the analysis has been completed. Unlike the adhesive 15, the contact medium 12 illustrated in FIG. 1 does not adhesively fix the container 13 and the protective layer 11 together. Therefore, in this process, the container 13 can be easily removed by loosening the pressing force of the pressing structure 14.

(Step S109: Contact Medium Removal Process) The operator or the mechanism controlled by the computer 53 illustrated in FIG. 19 removes the contact medium 12 (see FIG. 1) from the ultrasonic transducer holder 101. Examples of a removal method include a method of sucking the contact medium 12 with a suction nozzle (not illustrated), a method of scraping it with a cotton swab or cloth, or a method of sucking it with a sponge. From the viewpoint of more reliable removal, a method of spraying a cleaning liquid or a rinse liquid or using a cloth impregnated with these liquids can also be adopted. Particularly when using a cleaning liquid or a rinse liquid, it is preferable to dry the periphery of the application region by blowing gas around the application region after cleaning.

When reusing the container 13, the contact medium 12 adhering to the container 13 must also be removed. When the container 13 is single-use, then the process returns to step S101, and steps S101 to S110 are repeated using a new container 13. When performing repeated analysis, this process can be omitted when the container 13 is reused with the contact medium 12 left. However, from the viewpoint of suppressing entrainment of air bubbles in the contact medium 12 or protrusion of the contact medium from the application region 12R (see FIG. 6), it is preferable to remove the used contact medium 12 by performing this process. In the last cycle of repeated analyses, completion of this process terminates the analytical work.

Analysis System Using Computer

Next, a preferred aspect of processing executed by the computer when the analysis flow illustrated in FIG. 20 is executed using the computer illustrated in FIG. 19 will be described. FIG. 21 is an explanatory view illustrating an example of a process flow by a computer in an analysis method using the analysis system illustrated in FIGS. 18 and 19. FIG. 22 is an explanatory view illustrating an example of a process flow following FIG. 21. FIG. 21 illustrates an example in which step S101 illustrated in FIG. 20 is executed after steps S102 and S104. The flows illustrated in FIGS. 21 and 22 have processes in common with that of the flow described with reference to FIG. 20. As for these processes, the processes different from the description with reference to FIG. 20 will be described, and description of common parts will be omitted. In the analysis processes illustrated in FIGS. 21 and 22, the computer 53 illustrated in FIG. 9 performs the following processes.

(Step S103: Container Fixing Process) Step S103 illustrated in FIG. 21 includes a process (step S103A) of pressing the container 13 illustrated in FIG. 19 with the pressing structure 14, and a process (step S103B) of detecting a force with which the container 13 is pressed after step S103A. In step S103A, the mechanism controlled by the computer 53 drives the pressing structure 14 to press the container 13. In step S103B, the computer 53 detects the pressing force by the pressing structure 14. The computer 53 is electrically connected to a pressure sensor (not illustrated) connected to the pressing structure 14, the container 13, or the ultrasonic transducer holder 101, for example. The computer 53 acquires pressing force data from the pressure sensor (not illustrated). The computer 53 displays a message on a display device 57 connected to the computer 53 as a warning display process when the detected pressing force is lower or higher than a set pressing force range. When the pressure value is out of the set range, the computer 53 outputs a message, for example, "Check for pressing state of container".

(Step S101: Contact Medium Application Process) Step S101 illustrated in FIG. 21 includes a process (step S101A)

of supplying the contact medium 12 (see FIGS. 13 and 14) to the application region 12R (see FIGS. 12 to 15) of the protective layer 11, a process (step S101B) of detecting a liquid feeding pressure when the contact medium is supplied, and a process (step S101C) of detecting the presence or absence of the contact medium discharged from the second pore 32B (see FIGS. 12 to 14).

In step S101A, the contact medium 12 is injected from the injector (syringe) 33 to the first pore 32A through the pipe 35, as illustrated in FIGS. 13 and 14, for example.

In step S101B, the pressure sensor 34 connected between the injector 33 and the first pore 32A measures the injection pressure (in other words, liquid pressure) of the contact medium 12. The pressure sensor 34 may be of a type that directly measures the injection pressure of the injector 33. The computer 53 (see FIG. 19) is electrically connected to the pressure sensor 34 and acquires pressure value data from the pressure sensor 34. When the pressure value is lower than a preset range (lower limit threshold), the computer 53 determines that there is an abnormality, and displays a message meaning, for example, "Check for a gap between container and transducer holder and leakage of contact medium" on the display device 57 (see FIG. 19). Further, when the pressure value is higher than a set range (upper limit threshold), the computer 53 determines that there is an abnormality, and displays a message meaning, for example, "Check for pore clogging", on the display device 57. Also, when the pressure value is within the set range, the computer 53 determines that it is normal, and either outputs no message or displays a message meaning "there is no abnormality in supply pressure of contact medium" on the display device 57 (see FIG. 19). The process in step S101B can be expressed as follows. That is, the computer 53 specifies the application or filling state of the contact medium 12 (see FIG. 1), and outputs a message indicating the abnormality when the specified state indicates an abnormality. This message also indicates that the contact medium 12 is not sufficiently filled or applied. This process allows the operator to easily recognize the occurrence of an abnormality, thereby reducing the loss of working in an abnormal state.

In step S101C, the computer 53 detects the presence or absence of the contact medium ejected from the second pore 32B (see FIGS. 12 to 14). As for the detection method, for example, a sensor (not illustrated) capable of detecting a change in an outlet (an end portion exposed on the surface of the protective layer 11) of the second pore 32B is installed. This sensor is, for example, a sensor that utilizes electrodes that detect light rays, ultrasonic waves, or electrical changes. When the contact medium 12 is not detected, the contact medium is not yet sufficiently filled, so the computer 53 outputs a control signal to continue step S101A. On the other hand, when the contact medium 12 is detected, the computer 53 determines that the contact medium 12 is sufficiently filled, and proceeds to the next step S104.

The flows illustrated in FIGS. 21 and 22 are different from the flow described with reference to FIG. 20 in that step S201 is provided between step S104 and step S105 and step S202 is provided between step S105 and step S106. Steps S201 and S202 will be described in order below.

(Step S201: First Data Acquisition Process) The computer 53 acquires first data regarding the liquid sample 201 in the container 13 after step S104 illustrated in FIG. 21 and before step S105 illustrated in FIG. 22. The first data is intensity or spectrum data of transmitted light rays of the liquid sample 201 in the container 13 in a state in which ultrasonic waves are not oscillated.

(Step S202: Process for determining Application State of Contact Medium) The computer 53 determines the application state of the contact medium 12 (see FIGS. 13 and 14) after step S201 illustrated in FIG. 21 and step S105 illustrated in FIG. 22. Step S202 includes the following processes.

(Step S202A: Second Data Acquisition Process) The computer 53 acquires second data regarding the liquid sample 201 in the container 13 after step S201 illustrated in FIG. 21 and step S105 illustrated in FIG. 22. The second data is transmitted light intensity or spectrum data of the liquid sample 201 in the container 13 after ultrasonic waves are oscillated.

(Step S202B: Data Comparison Process) The computer 53 compares the first data and second data, and determines whether the contact medium 12 is applied in a good or bad state based on the first data and the second data. When any of the following conditions are met, the computer 53 determines that there is an abnormality, and displays a message on the display device 57 connected to the computer 53 as warning display processing. The above-mentioned conditions are a case where the transmitted light intensity of the second data is lower than a set range, a case where the spectrum baseline of the second data is higher than a set range, a case where regarding the transmitted light intensity, a difference between the second data and the first data is smaller than a lower threshold, and a case where regarding the spectrum baseline height, a difference between the second data and the first data is smaller than a lower threshold. When any of these conditions is met, the application or filling of the contact medium 12 is insufficient and the ultrasonic waves are not sufficiently transmitted into the container 13, and thus the liquid sample 201 in the container 13 may not form the aggregation layer 56 (see FIG. 18) due to the acoustic radiation force of ultrasonic waves, and may not form a transparent portion. Therefore, in this case, the computer 53 displays, for example, a message meaning "check the contact medium" on the display device 57 as warning processing. On the other hand, when none of the above-described conditions is met, the computer determines that the contact medium 12 is in a normal state of application, and proceeds to the next step S106.

Steps S201 and S202 described above correspond to one aspect of the expression "The computer 53 specifies the application or filling state of the contact medium 12 (see FIG. 1), and outputs a message indicating the abnormality when the specified state indicates an abnormality." described above.

Thereafter, each process after step S106 is the same as the flow described with reference to FIG. 20, so redundant description will be omitted. However, when the analysis is repeated from step S106 to step S108 illustrated in FIG. 22, step S202 can be omitted in the second and subsequent cycles. Methods for specifying various states such as the pressed state of the container 13 and the application state of the contact medium 12 may be methods other than those exemplified above. For example, instead of measuring the pressing force of the pressing structure 14 described in step S103B, the position and displacement of the container 13 may be measured. Also, in step S101B, instead of detecting the liquid feeding pressure when injecting the contact medium 12, the time from the start of injection until the contact medium 12 comes out of the second pore 32B may be measured.

Although several embodiments including modification examples are described above, the present invention is not limited to the above-described examples and representative modification examples, and various modification examples can be applied without departing from the gist of the invention. For example, substances put in the container 13 can include various substances such as liquid chemicals, medicines, foods (including beverages), and environmental samples. In addition to suspensions containing solid fine particles, the invention can also be applied to emulsions in which oil droplets are dispersed, liquids in which air bubbles are dispersed, and the like. Furthermore, the shape and size of the container 13, the ultrasonic transducer 10, the protective layer 11, and the ultrasonic transducer holder 101 can also be changed. Moreover, although various modification examples are described above, each modification example can be appropriately combined and applied. In addition, it is possible to add, delete, or replace a part of other configurations with respect to a part of the configuration of each embodiment.

INDUSTRIAL APPLICABILITY

The present invention is applicable to an analysis system.

REFERENCE SIGNS LIST

10: ultrasonic transducer
10A: attachment surface
11: protective layer
11A: first surface
11B: second surface
11C: third surface (side surface)
11D: fourth surface (side surface)
11E: fifth surface (upper surface)
11F: sixth surface (lower surface)
11G: bottom surface
11H: recess portion (groove, hole)
11R1, 11R3: fixing region
11R2: peripheral region
11T1, 11T2: thickness
12: contact medium
12R: application region
13: container
13A: side surface
13B: pressed surface
14: pressing structure (pressing member)
15: adhesive
20: application region mark
20: application region
21: guide member
21A: recess portion
21B: convex portion
31: recess
32: pore
32A: first pore
32B: second pore
33: injector (syringe)
34: pressure sensor
35: pipe
41: roller
42: nozzle
50: oscillator
51: light source
52: light receiving portion
53: computer
54: spectroscopic analysis portion
55: light beam
56: aggregation layer
57: display device
101, 101A, 101B, 101C, 101D: ultrasonic transducer holder
131: inlet
132: outlet
201: liquid sample
300: analysis system
S101 to S110, S101A, S101B, S101C, S103A, S103B, S201, S202, S202A, S202B: step

The invention claimed is:

1. An ultrasonic transducer holder in which a container for containing a liquid sample is detachable and which transmits an ultrasonic wave, the ultrasonic transducer holder comprising:
   an ultrasonic transducer that emits an ultrasonic wave; and
   a protective layer that is fixed to the ultrasonic transducer and transmits the ultrasonic wave to the container,
   wherein the protective layer includes a first surface that is a surface to which the ultrasonic transducer is fixed, and a second surface that is a back surface of the first surface and is designed to fix the container via a contact medium which is interposed between the second surface and an outside of the container.

2. The ultrasonic transducer holder according to claim 1, wherein
   the contact medium is a liquid or sol substance.

3. The ultrasonic transducer holder according to claim 2, wherein
   the second surface has an application region mark that is a mark indicating an application region of the contact medium.

4. The ultrasonic transducer holder according to claim 3, wherein
   the application region is a region that includes a region where a space obtained by extending the ultrasonic transducer in a normal direction and the second surface intersect.

5. The ultrasonic transducer holder according to claim 3, wherein
   the application region is a region that includes a region where a space obtained by extending the ultrasonic transducer and the second surface intersect in a propagation direction of the ultrasonic wave.

6. The ultrasonic transducer holder according to claim 3, further comprising:
   a guide member that guides the container to be fixed to the application region.

7. The ultrasonic transducer holder according to claim 2, wherein
   the ultrasonic transducer holder includes a first pore for filling the contact medium, and
   a recess that is in contact with the second surface and the first pore and is designed to fill the contact medium as an application region.

8. The ultrasonic transducer holder according to claim 7, wherein
   the ultrasonic transducer holder has a second pore for discharging air or the contact medium remaining in the recess.

9. The ultrasonic transducer holder according to claim 1, wherein
   a thickness of the protective layer is 0.5 times or more and 10 times or less of a half wavelength of the ultrasonic wave in the protective layer.

10. The ultrasonic transducer holder according to claim 1, wherein the ultrasonic transducer holder has a fixing structure that fixes the container.

11. The ultrasonic transducer holder according to claim 10, wherein
the fixing structure has,
a pressing structure that presses the container in a direction of the second surface.

12. An analysis system, comprising:
an ultrasonic transducer holder comprising
   an ultrasonic transducer that emits an ultrasonic wave; and
   a protective layer that is fixed to the ultrasonic transducer and transmits the ultrasonic wave to the container,
   wherein the protective layer includes a first surface that is a surface to which the ultrasonic transducer is fixed, and a second surface that is a back surface of the first surface and is designed to fix the container via a contact medium which is interposed between the second surface and an outside of the container;
a container that is detachable from the ultrasonic transducer holder;
an oscillator that applies voltage to the ultrasonic transducer;
a light source that irradiates the container with a light ray;
a light receiving portion that receives a light ray transmitted through the container; and
a computer that performs analysis processing of the liquid sample based on the light ray received by the light receiving portion.

13. The analysis system according to claim 12, wherein
the computer,
specifies an application or filling state of the contact medium, and
outputs a message indicating an abnormality when a specified state indicates an abnormality, and
the message indicates that the contact medium is not sufficiently filled or applied.

14. A container that is detachable from an ultrasonic transducer holder, the container comprising:
a side surface;
an inlet for feeding the liquid sample; and
an outlet for discharging the liquid sample,
wherein the ultrasonic transducer holder includes
   an ultrasonic transducer that emits an ultrasonic wave; and
   a protective layer that is fixed to the ultrasonic transducer and transmits the ultrasonic wave to the container,
   wherein the protective layer includes a first surface that is a surface to which the ultrasonic transducer is fixed, and a second surface that is a back surface of the first surface and is designed to fix the container via a contact medium which is interposed between the second surface and an outside of the container,
wherein the second surface has an application region mark that is a mark indicating an application region of the contact medium, and
wherein the side surface of the container has a shape corresponding to the application region of the ultrasonic transducer.

15. The container according to claim 14, wherein
the ultrasonic transducer has a guide member for guiding fixing of the container to the application region, and
the container has a shape corresponding to a shape of the guide member.

* * * * *